US012310510B2

(12) United States Patent
Jacobs et al.

(10) Patent No.: US 12,310,510 B2
(45) Date of Patent: *May 27, 2025

(54) POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS

(71) Applicants: Frederick Jacobs, Holland, MI (US); Matthew Jacobs, Holland, MI (US); Terry Plumert, Grand Haven, MI (US)

(72) Inventors: Frederick Jacobs, Holland, MI (US); Matthew Jacobs, Holland, MI (US); Terry Plumert, Grand Haven, MI (US)

(73) Assignees: Frederick Jacobs, Holland, MI (US); Matthew Jacobs, Holland, MI (US); Terry Plumert, Grand Haven, MI (US)

( * ) Notice: Subject to any disclaimer, the term of this patent is extended or adjusted under 35 U.S.C. 154(b) by 254 days.

This patent is subject to a terminal disclaimer.

(21) Appl. No.: 17/823,039

(22) Filed: Aug. 29, 2022

(65) Prior Publication Data
US 2022/0408937 A1 Dec. 29, 2022

Related U.S. Application Data

(63) Continuation-in-part of application No. 17/165,906, filed on Feb. 2, 2021, now Pat. No. 11,426,007, and
(Continued)

(51) Int. Cl.
A47C 29/00 (2006.01)
A47C 1/029 (2006.01)
(Continued)

(52) U.S. Cl.
CPC ............ *A47C 31/008* (2013.01); *A47C 1/029* (2013.01); *A47C 1/03211* (2013.01);
(Continued)

(58) Field of Classification Search
CPC ......... A47C 7/506; A47C 7/748; A47C 7/624; A47C 7/70; A47C 7/723; A47C 7/727;
(Continued)

(56) References Cited

U.S. PATENT DOCUMENTS 9,655,458 B2 * 5/2017 Jacobs .................... A47C 1/121
9,730,518 B1 * 8/2017 Jacobs ..................... A47C 7/70
(Continued)

*Primary Examiner* — Chi Q Nguyen
(74) *Attorney, Agent, or Firm* — Dickinson Wright PLLC

(57) ABSTRACT

A remotely controlled powered chair may include a support frame, a seat pivotally mounted on the support frame, an rotary actuator mounted between the support frame and the seat to drive the seat to move relative to the support frame, a backrest pivotally mounted on the seat, and a linear actuator mounted between the seat and the backrest to drive the backrest to move relative to the seat. Thus, the rotary actuator may be controlled by an electrically control device to drive the seat to pivot relative to the support frame reciprocally in a pendulum manner so that the seat is pivoted relative to the support frame automatically. In addition, the linear actuator may be controlled by the electrically control device to adjust the inclined angle of the backrest so as to provide a comfortable sensation to the user. A remotely controlled powered chair may include a base assembly. A chair frame is supported on the base assembly. An actuator mechanism may communicate with the base assembly and the chair frame, and is operable to actuate the chair frame between first and second positions.

20 Claims, 32 Drawing Sheets

Related U.S. Application Data a continuation-in-part of application No. 16/819,068, filed on Mar. 14, 2020, now Pat. No. 12,150,551, which is a continuation-in-part of application No. 16/638,492, filed on Feb. 12, 2020, now Pat. No. 10,973,343, said application No. 17/165,906 is a continuation-in-part of application No. 16/638,492, filed on Feb. 12, 2020, now Pat. No. 10,973,343, said application No. 16/819,068 is a continuation-in-part of application No. 16/788,280, filed on Feb. 11, 2020, now Pat. No. 11,484,127, application No. 17/823,039 is a continuation-in-part of application No. 16/788,280, filed on Feb. 11, 2020, now Pat. No. 11,484,127, said application No. 16/819,068 is a continuation-in-part of application No. 16/181,585, filed on Nov. 6, 2018, now Pat. No. 10,722,032, and a continuation-in-part of application No. 15/710,768, filed on Sep. 20, 2017, now Pat. No. 10,568,429, said application No. 16/638,492 is a continuation of application No. 15/675,865, filed on Aug. 14, 2017, now Pat. No. 9,943,174, said application No. 16/819,068 is a continuation-in-part of application No. 15/640,946, filed on Jul. 3, 2017, now Pat. No. 10,555,610, said application No. 15/675,865 is a continuation-in-part of application No. PCT/US2016/025803, filed on Apr. 3, 2016, said application No. 16/788,280 is a continuation-in-part of application No. PCT/US2016/025803, filed on Apr. 3, 2016, said application No. 15/640,946 is a continuation-in-part of application No. 14/331,404, filed on Jul. 15, 2014, now Pat. No. 9,693,631.

(60) Provisional application No. 63/319,761, filed on Mar. 14, 2022, provisional application No. 62/206,837, filed on Aug. 18, 2015, provisional application No. 62/175,210, filed on Jun. 12, 2015, provisional application No. 62/159,791, filed on May 11, 2015, provisional application No. 62/149,596, filed on Apr. 19, 2015, provisional application No. 62/143,079, filed on Apr. 4, 2015, provisional application No. 62/018,854, filed on Jun. 30, 2014, provisional application No. 62/006,363, filed on Jun. 2, 2014, provisional application No. 61/946,824, filed on Mar. 2, 2014, provisional application No. 61/868,547, filed on Aug. 21, 2013, provisional application No. 61/856,013, filed on Jul. 18, 2013.

(51) Int. Cl.
| | | |
|---|---|---|
| *A47C 1/032* | (2006.01) | |
| *A47C 1/034* | (2006.01) | |
| *A47C 1/0355* | (2013.01) | |
| *A47C 1/121* | (2006.01) | |
| *A47C 1/124* | (2006.01) | |
| *A47C 1/126* | (2006.01) | |
| *A47C 1/13* | (2006.01) | |
| *A47C 4/06* | (2006.01) | |
| *A47C 7/62* | (2006.01) | |
| *A47C 7/68* | (2006.01) | |
| *A47C 7/70* | (2006.01) | |
| *A47C 7/72* | (2006.01) | |
| *A47C 7/74* | (2006.01) | |
| *A47C 31/00* | (2006.01) | |
| *A61H 1/00* | (2006.01) | |
| *A61H 23/00* | (2006.01) | |
| *A61H 23/02* | (2006.01) | |
| *G06Q 10/02* | (2012.01) | |
| *H01R 24/70* | (2011.01) | |
| *H01R 24/78* | (2011.01) | |
| *H01R 103/00* | (2006.01) | |
| *H04W 4/80* | (2018.01) | |

(52) U.S. Cl.
CPC .......... *A47C 1/0345* (2013.01); *A47C 1/0355* (2013.01); *A47C 1/121* (2013.01); *A47C 1/124* (2013.01); *A47C 1/126* (2013.01); *A47C 1/13* (2013.01); *A47C 4/06* (2013.01); *A47C 7/624* (2018.08); *A47C 7/70* (2013.01); *A47C 7/705* (2018.08); *A47C 7/72* (2013.01); *A47C 7/725* (2013.01); *A47C 7/74* (2013.01); *A47C 7/746* (2013.01); *A47C 7/748* (2013.01); *A61H 1/001* (2013.01); *A61H 23/004* (2013.01); *A61H 23/0254* (2013.01); *G06Q 10/02* (2013.01); *H01R 24/70* (2013.01); *H01R 24/78* (2013.01); *A61H 2201/0149* (2013.01); *A61H 2201/02* (2013.01); *A61H 2201/0207* (2013.01); *A61H 2201/0214* (2013.01); *A61H 2201/1223* (2013.01); *A61H 2201/1623* (2013.01); *A61H 2201/501* (2013.01); *A61H 2201/5048* (2013.01); *A61H 2201/5071* (2013.01); *A61H 2201/5074* (2013.01); *A61H 2201/5089* (2013.01); *A61H 2201/5097* (2013.01); *H01R 2103/00* (2013.01); *H04W 4/80* (2018.02)

(58) Field of Classification Search
CPC ....... A47C 7/025; A47C 1/035; A47C 1/0342; A47C 1/124; A47C 1/0242; A47C 1/13; A47C 1/03211; A47C 1/0355; A47C 1/036; A47C 31/008; A47C 1/022; A47C 1/00; A47C 3/025; B64D 11/06; B64D 11/0601; B64D 25/04
See application file for complete search history.

(56) References Cited

U.S. PATENT DOCUMENTS

| | | | | |
|---|---|---|---|---|
| 10,349,744 | B2* | 7/2019 | Jacobs | A47C 7/70 |
| 10,357,107 | B2* | 7/2019 | Jacobs | A47C 7/725 |
| 10,555,610 | B2* | 2/2020 | Jacobs | A47C 1/126 |
| 10,568,429 | B2* | 2/2020 | Jacobs | F16B 12/00 |
| 10,722,032 | B2* | 7/2020 | Jacobs | A47C 7/622 |
| 10,973,343 | B2* | 4/2021 | Jacobs | A47C 1/0355 |
| 11,297,948 | B2* | 4/2022 | Jacobs | A47C 1/023 |
| 11,426,007 | B2* | 8/2022 | Jacobs | A47C 7/624 |
| 11,484,127 | B2* | 11/2022 | Jacobs | A47C 7/705 |
| 11,490,736 | B1* | 11/2022 | Liu | A47C 7/624 |

* cited by examiner

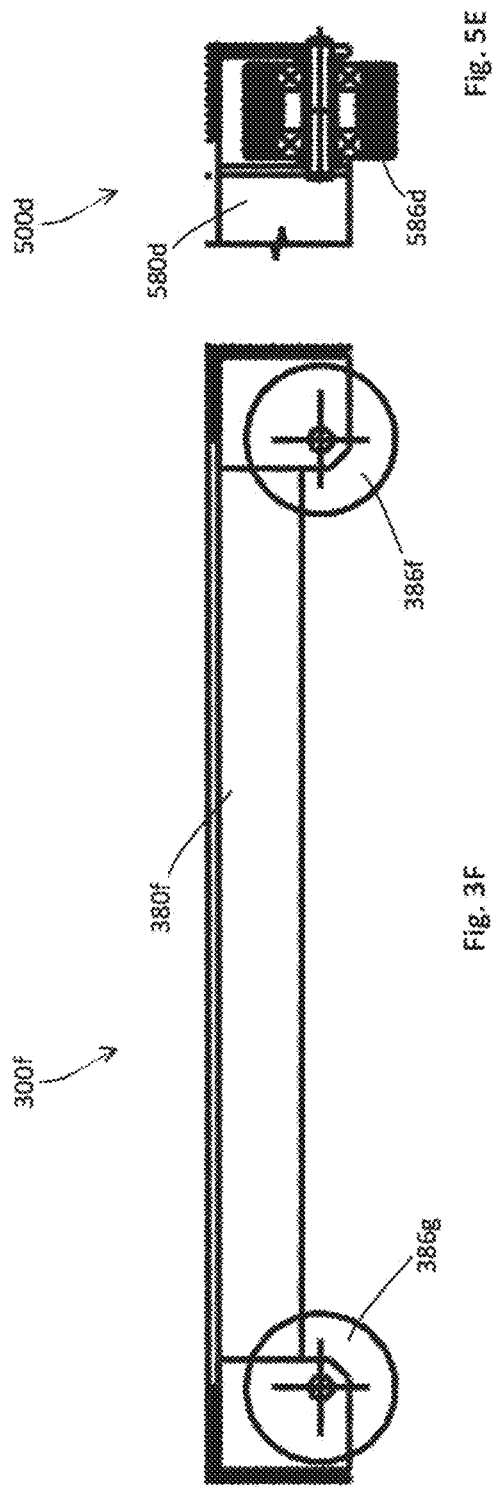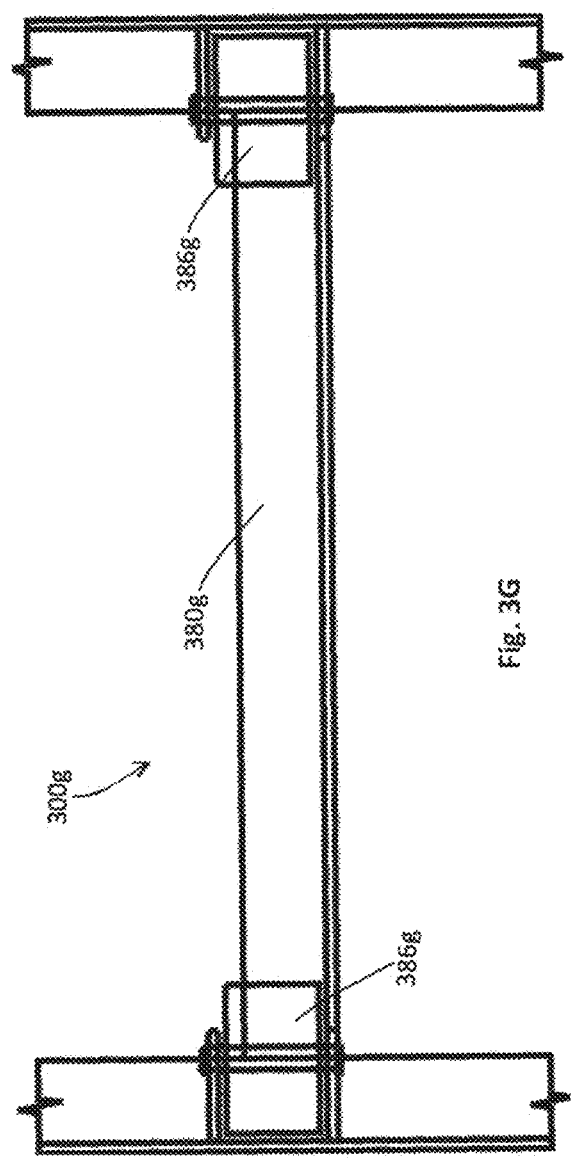

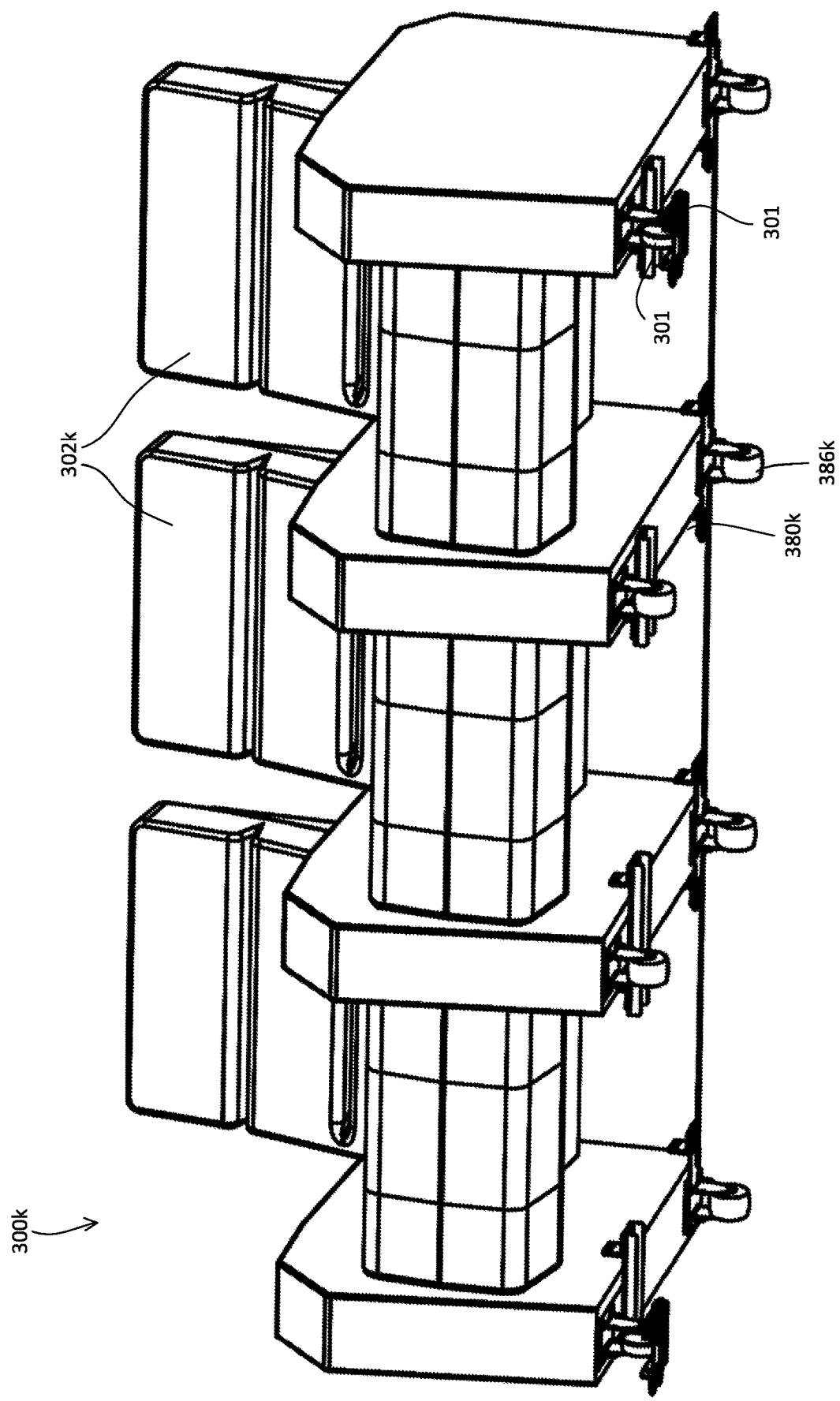

POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS

CROSS REFERENCE TO RELATED APPLICATIONS

The present application claims priority to U.S. Provisional Patent Application Ser. Nos. 63/319,761, filed Mar. 14, 2022; 63/315,266, filed Dec. 23, 2021; and 63/291,945, filed Dec. 20, 2021, the entire disclosures of which are incorporated herein by reference thereto.

The present application is a continuation-in-part of U.S. patent application Ser. No. 16/819,068, filed Mar. 14, 2020, entitled CHAIR ASSEMBLIES, MODULAR COMPONENTS FOR USE WITHIN CHAIR ASSEMBLIES, AND PARTS FOR USE WITHIN THE MODULAR COMPONENTS, which claims priority to U.S. Provisional Patent Application Ser. No. 62/911,052, filed Oct. 4, 2019, entitled CHAIR ASSEMBLIES, TABLE ASSEMBLIES, MODULAR COMPONENTS FOR USE WITHIN CHAIR ASSEMBLIES AND TABLE ASSEMBLIES, AND PARTS FOR USE WITHIN THE MODULAR COMPONENTS, and U.S. Provisional Patent Application Ser. No. 62/871,162, filed Jul. 7, 2019, entitled CHAIR ASSEMBLIES, TABLE ASSEMBLIES, MODULAR COMPONENTS FOR USE WITHIN CHAIR ASSEMBLIES AND TABLE ASSEMBLIES, AND PARTS FOR USE WITHIN THE MODULAR COMPONENTS, the entire disclosures of which are incorporated herein by reference thereto.

The present application is a continuation-in-part of U.S. patent application Ser. No. 16/819,068, filed Mar. 14, 2020, entitled CHAIR ASSEMBLIES, MODULAR COMPONENTS FOR USE WITHIN CHAIR ASSEMBLIES, AND PARTS FOR USE WITHIN THE MODULAR COMPONENTS, which is a continuation-in-part of U.S. patent application Ser. No. 16/181,585, filed Nov. 6, 2018, entitled CHAIR ASSEMBLIES, MODULAR COMPONENTS FOR USE WITHIN CHAIR ASSEMBLIES, AND PARTS FOR USE WITHIN THE MODULAR COMPONENTS, which is a continuation-in-part of U.S. patent application Ser. No. 16/788,280, filed Feb. 11, 2020, entitled CHAIR ASSEMBLIES, TABLE ASSEMBLIES, MODULAR COMPONENTS FOR USE WITHIN CHAIR ASSEMBLIES AND TABLE ASSEMBLIES, AND PARTS FOR USE WITHIN THE MODULAR COMPONENTS, which is a continuation-in-part of U.S. patent application Ser. No. 16/638,492, filed Feb. 12, 2020, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, which is a continuation-in-part of U.S. patent application Ser. No. 15/710,768, filed Sep. 20, 2017, entitled ROCKER STYLE CHAIRS, MODULAR COMPONENTS FOR USE WITHIN ROCKER STYLE CHAIRS AND PARTS FOR USE WITHIN THE MODULAR COMPONENTS, and which is a continuation-in-part of U.S. patent application Ser. No. 16/181,585, filed Nov. 6, 2018, entitled TELESCOPIC SEATING SYSTEMS, AND FOLDABLE CHAIRS AND RELATED COMPONENTS FOR USE WITHIN TELESCOPIC SEATING SYSTEMS, the entire disclosures of which are incorporated herein by reference thereto.

The present application is a continuation-in-part of U.S. patent application Ser. No. 16/788,280, filed Feb. 11, 2020, entitled CHAIR ASSEMBLIES, MODULAR COMPONENTS FOR USE WITHIN CHAIR ASSEMBLIES, AND PARTS FOR USE WITHIN THE MODULAR COMPONENTS which claims priority to U.S. Provisional Patent Application Ser. No. 62/911,052, filed Oct. 4, 2019, entitled CHAIR ASSEMBLIES, TABLE ASSEMBLIES, MODULAR COMPONENTS FOR USE WITHIN CHAIR ASSEMBLIES AND TABLE ASSEMBLIES, AND PARTS FOR USE WITHIN THE MODULAR COMPONENTS, U.S. Provisional Patent Application Ser. No. 62/871,162, filed Jul. 7, 2019, entitled CHAIR ASSEMBLIES, TABLE ASSEMBLIES, MODULAR COMPONENTS FOR USE WITHIN CHAIR ASSEMBLIES AND TABLE ASSEMBLIES, AND PARTS FOR USE WITHIN THE MODULAR COMPONENTS, and U.S. Provisional Patent Application Ser. No. 62/816,707, filed Mar. 11, 2019, entitled CHAIR ASSEMBLIES, TABLE ASSEMBLIES, MODULAR COMPONENTS FOR USE WITHIN CHAIR ASSEMBLIES AND TABLE ASSEMBLIES, AND PARTS FOR USE WITHIN THE MODULAR COMPONENTS, the entire disclosures of which are incorporated herein by reference thereto.

The present application is a continuation-in-part of U.S. patent application Ser. No. 16/788,280, filed Feb. 11, 2020, entitled CHAIR ASSEMBLIES, MODULAR COMPONENTS FOR USE WITHIN CHAIR ASSEMBLIES, AND PARTS FOR USE WITHIN THE MODULAR COMPONENTS, which is a continuation-in-part of U.S. patent application Ser. No. 16/181,585, filed Nov. 6, 2018, entitled CHAIR ASSEMBLIES, MODULAR COMPONENTS FOR USE WITHIN CHAIR ASSEMBLIES, AND PARTS FOR USE WITHIN THE MODULAR COMPONENTS, International Patent Cooperation Treaty Application No. PCT/US18/46569, filed Aug. 13, 2018, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, U.S. patent application Ser. No. 15/710,768, filed Sep. 20, 2017, entitled ROCKER STYLE CHAIRS, MODULAR COMPONENTS FOR USE WITHIN ROCKER STYLE CHAIRS AND PARTS FOR USE WITHIN THE MODULAR COMPONENTS, and U.S. patent application Ser. No. 16/181,585, filed Nov. 6, 2018, entitled TELESCOPIC SEATING SYSTEMS, AND FOLDABLE CHAIRS AND RELATED COMPONENTS FOR USE WITHIN TELESCOPIC SEATING SYSTEMS, the entire disclosures of which are incorporated herein by reference thereto.

The present application is a continuation-in-part of U.S. patent application Ser. No. 17/165,906, filed Feb. 2, 2021, entitled CHAIR ASSEMBLIES, MODULAR COMPONENTS FOR USE WITHIN CHAIR ASSEMBLIES, AND PARTS FOR USE WITHIN THE MODULAR COMPONENTS, which is a continuation-in-part of U.S. patent application Ser. No. 16/638,492, filed Feb. 12, 2020, entitled CHAIR ASSEMBLIES, MODULAR COMPONENTS FOR USE WITHIN CHAIR ASSEMBLIES, AND PARTS FOR USE WITHIN THE MODULAR COMPONENTS, U.S. patent application Ser. No. 16/181,585, filed Nov. 6, 2018, entitled CHAIR ASSEMBLIES, MODULAR COMPONENTS FOR USE WITHIN CHAIR ASSEMBLIES, AND PARTS FOR USE WITHIN THE MODULAR COMPONENTS, U.S. patent application Ser. No. 16/788,280, filed Feb. 11, 2020, entitled CHAIR ASSEMBLIES, TABLE ASSEMBLIES, MODULAR COMPONENTS FOR USE WITHIN CHAIR ASSEMBLIES AND TABLE ASSEMBLIES, AND PARTS FOR USE WITHIN THE MODULAR COMPONENTS, U.S. patent application Ser. No. 16/638,492, filed Feb. 12, 2020, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, U.S. patent application Ser. No. 15/710,768, filed Sep. 20, 2017, entitled ROCKER STYLE CHAIRS, MODULAR COMPONENTS FOR USE WITHIN ROCKER STYLE CHAIRS AND PARTS FOR USE WITHIN THE MODULAR COMPONENTS, and U.S. patent application Ser. No. 16/181,585, filed Nov. 6, 2018, entitled TELESCOPIC SEATING SYSTEMS, AND FOLDABLE CHAIRS AND RELATED COMPONENTS FOR USE WITHIN TELESCOPIC SEATING SYSTEMS, the entire disclosures of which are incorporated herein by reference thereto.

TECHNICAL FIELD

The present disclosure generally relates to powered chairs. More particularly, the present disclosure relates to managing operation of a plurality of powered chairs within an associated venue.

BACKGROUND

Powered recliner chairs are currently available that operate individually, such that an occupant of the chair can move the respective chair between an upright position and a reclined position via a local control.

Conventionally, power-assisted chairs include a motor-operated lift mechanism for aiding persons that require assistance in entering or exiting the chair. More particularly, motor-operated lift mechanisms are interconnected between a stationary base assembly and a moveable chair frame. Alternatively, some power-assisted chairs include separate linkage mechanisms for permitting the seat occupant to selectively extend and retract a leg rest assembly and/or produce reclining angular movement between an upright first position and a reclined second position.

A conventional rocking chair may include a chair body and a substantially arc-shaped support bracket mounted on a bottom of the chair body. Thus, when a user applies a force on the chair body by his/her own gravity, the support bracket functions as a rocking fulcrum of the chair body so that the rocking chair is rocked forward and backward. However, the user has to exert a force on the chair body so as to rock the rocking chair, so that the user seated on the rocking chair cannot relax himself/herself, thereby easily causing an uncomfortable sensation to the user.

Power-assisted chairs may be adapted to provide the lift and tilt function in combination with a leg rest and/or reclining function. Chairs which provide such a combination of multi-positional functions generally require the use of multiple motors for driving the separate linkages, which results in extremely large and expensive chair units. In addition, most power-assisted chairs incorporate a drive mechanism that employs both a power drive function for extending the leg rest, lifting the chair, and reclining the chair, and a power return function for returning the chair to the normal seated position.

An important characteristic of power-assisted chairs is the ability to support heavy loads during the lift and tilt functions. More specifically, power-assisted chairs are designed to support individuals of a particular weight. Typically, power-assisted chairs that are adapted to support weight above a particular threshold, such as 300 pounds, require multiple motors.

In any event, a powered chair is, at most, controlled via a local controller.

SUMMARY

A cub holder having a rear information plate may include a front clamp having a front information plate.

A chair assembly may include a cub holder including a front clamp and being clamped with the cub holder on a rear side of a chair back and the front clamp on a front side of a chair back.

A powered recliner chair may include a remote control. A remote control may be capable of controlling linear movement of a single chair or a group of chairs. For example, a remote control may be provided that allows a venue cleaning crew to reposition a powered recliner chair, or a group of powered recliner chairs, with, for example, a single button.

A remote recliner chair and associated venue operations system may include a controller capable of controlling a group of powered recliner chairs, and may further include a data logging and report generation feature that enables collection and analysis of information related to operation of the group of powered recliner chairs.

A powered recliner chair may include a host of features that enable a chair occupant to interact with accommodations within a given venue, or group of related venues.

Further benefits and advantages of the present invention will become apparent after a careful reading of the detailed description with appropriate reference to the accompanying drawings.

BRIEF DESCRIPTION OF THE DRAWING

FIGS. 5A-E depict various views of an example step-and-roll relocatable chair assembly with drink rail and foot rail assemblies.

DETAILED DESCRIPTION

Figure 1:
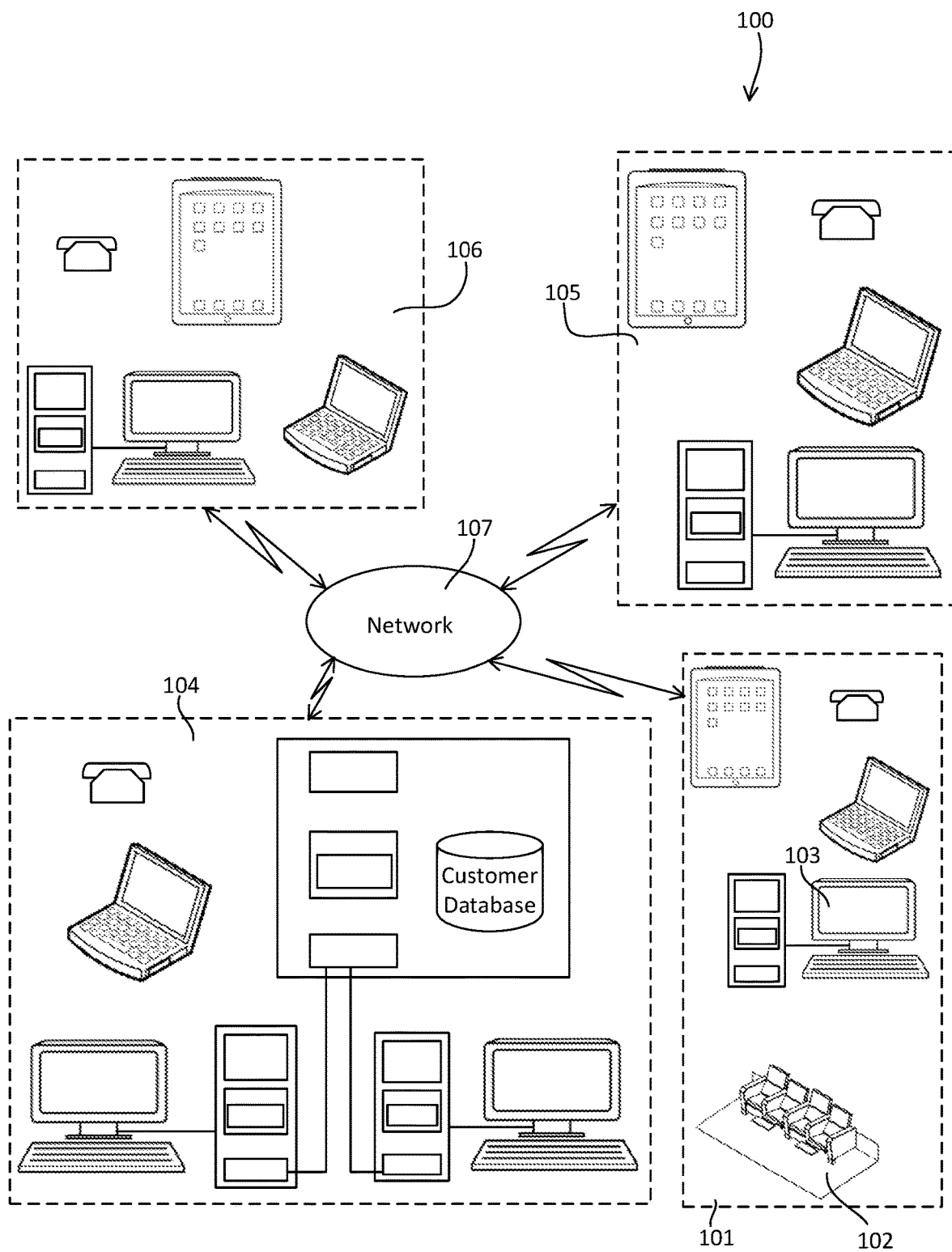
FIG. 1 depicts a high-level block diagram of a computer system for managing powered reclining chairs and venues that include powered reclining chairs.

Chair assemblies that provide linear movement of a plurality of chairs are disclosed in, for example, commonly owned U.S. patent application publication No. 20150021964, the entire disclosure of which is incorporated herein by reference. Chair assemblies that provide linear movement of a plurality of chairs and having power/data are disclosed in, for example, commonly owned U.S. Pat. No. 9,326,610, the entire disclosure of which is incorporated herein by reference. Powered recliner chairs are disclosed in commonly owned WO2016164281, the entire disclosure of which is incorporated herein by reference.

The present application is related to U.S. Provisional Patent Application Ser. No. 62/911,052, filed Oct. 4, 2019, entitled CHAIR ASSEMBLIES, TABLE ASSEMBLIES, MODULAR COMPONENTS FOR USE WITHIN CHAIR ASSEMBLIES AND TABLE ASSEMBLIES, AND PARTS FOR USE WITHIN THE MODULAR COMPONENTS, U.S. Provisional Patent Application Ser. No. 62/871,162, filed Jul. 7, 2019, entitled CHAIR ASSEMBLIES, TABLE ASSEMBLIES, MODULAR COMPONENTS FOR USE WITHIN CHAIR ASSEMBLIES AND TABLE ASSEMBLIES, AND PARTS FOR USE WITHIN THE MODULAR COMPONENTS, and U.S. Provisional Patent Application Ser. No. 63/313,266, filed Feb. 23, 2022, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, the entire disclosures of which are incorporated herein by reference thereto.

The present application is also related to U.S. patent application Ser. No. 16/181,585, filed Nov. 6, 2018, entitled CHAIR ASSEMBLIES, MODULAR COMPONENTS FOR USE WITHIN CHAIR ASSEMBLIES, AND PARTS FOR USE WITHIN THE MODULAR COMPONENTS, U.S. patent application Ser. No. 16/788,280, filed Feb. 11, 2020, entitled CHAIR ASSEMBLIES, TABLE ASSEMBLIES, MODULAR COMPONENTS FOR USE WITHIN CHAIR ASSEMBLIES AND TABLE ASSEMBLIES, AND PARTS FOR USE WITHIN THE MODULAR COMPONENTS, U.S. patent application Ser. No. 16/638,492, filed Feb. 12, 2020, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, U.S. patent application Ser. No. 15/710,768, filed Sep. 20, 2017, entitled ROCKER STYLE CHAIRS, MODULAR COMPONENTS FOR USE WITHIN ROCKER STYLE CHAIRS AND PARTS FOR USE WITHIN THE MODULAR COMPONENTS, and U.S. patent application Ser. No. 16/181,585, filed Nov. 6, 2018, entitled TELESCOPIC SEATING SYSTEMS, AND FOLDABLE CHAIRS AND RELATED COMPONENTS FOR USE WITHIN TELESCOPIC SEATING SYSTEMS, the entire disclosures of which are incorporated herein by reference thereto.

The systems and methods of the present disclosure may provide circuit designs to control powered recliner chairs, thereby, lower cost of routine maintenance and associated venue cleaning. A remote master controller may control multiple powered chairs. The master controller may be controlled/operated by venue management to ensure safe and efficient operation. A master controller may contain security features such as key locks, password protection, security handshake access etc.

A local master controller may be located at an end of a row of chairs, within a section of chairs, or in a secured location selected by venue management. A remote master controller may be accessed wirelessly, via a hard wired connection, or locally. A master controller may interact with other systems (e.g., emergency systems, food/drink vending operations, venue lighting, maintenance, etc.) to improve venue operations.

A master controller may have output(s)/circuit(s) to control chairs by circuit. Alternatively, a group of chairs may be mechanically interconnected, such that a single master controller may control a group of chairs.

Controlling multiple chairs at once may save time to perform venue tasks, such as cleaning or maintenance requiring chairs to be extended or retracted. A controller, having multiple output circuits, may allow for select chairs to be extended or retracted in a defined order to facilitate a desired task. For example, cleaning could be facilitated by have every other chair extended or retracted to allow the operator better access to an extended recliner chair in narrow rows. Alternate patterns of chair positioning may be achieved to aid in different tasks. For example, an entire venue of chairs may automatically move at a prescribed time sequence with a single initiation. While a controller may have multiple outputs, any given controller may only have one output circuit and associated chairs may include individual ID's or addresses such that a communication protocol of the controller may allow control of individual chair(s) or banks of chairs.

Controller output(s) may control chairs wirelessly using available technologies such as Bluetooth, or the controllers may be hard wired. Controller outputs may drive chair actuator(s) to their internal stops, settable by time so chairs could be partially extended or retracted, and/or sequenced to extend/retract chairs such that all chairs in a control group are fully extended or retracted to a position before be extended or retracted to a desired location.

Master controller circuits may control a slave control unit at each powered chair allowing parallel operation of a local user control switch or a master control circuit. Possible scenarios for parallel chair control may include, but are not limited to, an operator control switch and the control circuit that plug into a slave controller, allowing control of a powered chair by the operator or by the master control box, an operator control switch and a control circuit may connect wirelessly to a slave controller, allowing control of a powered chair by the operator or by the master controller. A control circuit connected (wired or wirelessly) to a powered chair switch which may allow parallel operation. A control circuit connected (wired or wirelessly) to a powered chair actuator, which may allow parallel chair operation.

Power to a powered chair may be extended directly from a transformer to a master controller, and/or slave controller(s) as needed. A slave controller may be powered via respective input circuits or switch circuits as required.

Lights (e.g., light emitting diodes (LEDs)) may be incorporated into the individual chairs. For example, a light may be incorporated under each chair to illuminate an area of a floor in proximity to the respective chair. The systems and methods of the present disclosure may notify a remote location of activity (e.g., venue cleaning, chair occupancy, chair movement, etc.). This lighting may be turned on, for example, during cleaning and/or prior to and/or after a movie to provide entrance and/or exit lighting. Similar to remote chair movement, the lighting may be remotely controlled. For example, all powered recliner chairs may automatically return to an upright position and/or all chair lights may be turned on in an event of an emergency situation in the associated venue.

Sensors (e.g., pressure sensors, proximity sensors, strain gauges, microphones, motion sensors, limit switches, temperature sensors, etc.) may be incorporated in a chair for safety purposes. For example, a sensor may indicate that movement of a chair has been inhibited because an individual and/or object would be in jeopardy of being damaged. The systems and methods of the present disclosure may provide a remote indication of corresponding events.

Sensors and/or actuators may be incorporated into a chair that record chair movements and/or any other events associated with the respective chair. Associated data may be automatically recorded and logged to provide information for use with preventive chair maintenance and/or routine chair maintenance.

A user interface may be provided that includes, for example, an overhead plan view map of a venue with each chair having alpha-numeric, color, graphical, etc. information related to respective chair status (e.g., need of maintenance, occupied, reclined, malfunction, number of movements since last maintenance, number of times occupied, length of time occupied, etc.)

The remote control system may automatically control other lighting in a venue. The systems and methods of the present disclosure may automatically record cleaning times and dates. Positions of each chair may be recording along with a time stamp for each chair position and/or chair movement. Occupancy sensors may be incorporated into a chair and may be used to record dates and times associated with when the respective chair was occupied. A weight sensor may be included that records a weight of an individual occupying a chair.

Local controls, located on each powered recliner chair, may allow a chair occupant to reposition the powered reclining chair. For example, a first button may be provided to move a powered reclining chair from an upright position toward a reclined position. A second button may be provided to move the powered reclining chair from a reclined position toward an upright position. Any number of buttons may be provided to move individual parts (e.g., a back, a lower lumbar support, a chair seat, an armrest, a foot rest, a calf rest, etc.) of a powered reclining chair independent of any other part. As described in more detail elsewhere herein, a powered reclining chair may be controlled via a cellular phone (e.g., a smartphone) implementing a powered reclining chair application.

Any given powered reclining chair may include speakers and/or a headphone connector plug. The speakers and/or the headphone connector may be hardwired to a venue sound system and/or may include a wireless connection to a venue sound system. Any given powered reclining chair may include a power and/or data connector, such that an occupant can plug in their cellular telephone and/or portable computer device. Thereby, an occupant may be above to order a drink and/or food from a venue delivery. The occupant may be enabled to pay for their drinks and/or food via their own device and/or via an interface attached to the powered reclining chair.

Turning to FIG. 1, a high-level block diagram of an example computer system 100 for managing powered reclining chairs is depicted. The computer system 100 may be as described in various ones of the above related patent applications that are incorporated herein by reference. The computer system 100 may include a central venue operations center 105 and a powered reclining chair site (e.g., a movie theater, a sports venue, an auditorium, an arena, a theater, or any other venue) communicatively couple via a communications network 107. The computer system 100 may also include a powered reclining chair technician site 104 and a powered reclining chair supplier site 106. While, for convenience of illustration, only a single central venue operations center 105 is depicted within the computer system 100 of FIG. 1, any number of central venue operations centers 105 may be included within the computer system 100. While, for convenience of illustration, only a single powered reclining chair site 101 is depicted within the computer system 100 of FIG. 1, any number of powered reclining chair sites 101 may be included within the computer system 100. Indeed, the computer system 100 may accommodate thousands of powered reclining chair sites 101. While, for convenience of illustration, only a single powered reclining chair technician site 104 is depicted within the computer system 100 of FIG. 1, any number powered reclining chairs of technician sites 104 may be included within the computer system 100. Any given powered reclining chair technician site 104 may be a mobile site. While, for convenience of illustration, only a single powered reclining chair supplier site 106 is depicted within the computer system 100 of FIG. 1, any number of powered reclining chair supplier sites 106 may be included within the computer system 100.

The communications network 107, any one of the network adapters and any one of the network connections may include a hardwired section, a fiber-optic section, a coaxial section, a wireless section, any sub-combination thereof or any combination thereof, including for example a wireless LAN, MAN or WAN, WiFi, WiMax, the Internet, a Bluetooth connection, or any combination thereof. Moreover, a central venue operations center 104, a powered reclining chair site 101, a powered reclining chair technician site 105 and/or a powered reclining chair supplier 106 site may be communicatively connected via any suitable communication system, such as via any publicly available or privately owned communication network, including those that use wireless communication structures, such as wireless communication networks, including for example, wireless LANs and WANs, satellite and cellular telephone communication systems, etc.

Any given central venue operations center 101 may include a mainframe, or central server, system, a server terminal, a desktop computer 102, a laptop computer and a telephone. While the central venue operations center 101 of FIG. 1 is shown to include only one mainframe, or central server, system, only one server terminal, only one desktop computer 102, only one laptop computer and only one telephone, any given central venue operations center 101 may include any number of mainframe, or central server, systems, server terminals 112, desktop terminals, laptop computers and telephones. Any given telephone may be, for example, a land-line connected telephone, a computer configured with voice over internet protocol (VOIP), or a mobile telephone (e.g., a smartphone). Any given chair 102 may include one or more Brelyon brelyon ultra reality display, as available from Brelyon 930 Park Pl, San Mateo, Calif. 94403, or similar, 120"+panoramic virtual image with meters of true optical depth that pans across your field of vision, all in a small footprint. The display provides a depth profile that is so natural to the eye that it relaxes the ciliary muscles of your eye and reduces your vergence stress, enabling comfortable extended use. For example, any given chair 102 may include a display on either side, a third display on a folding (or movable) tray, and overhead. Thereby, providing a chair occupant, for example, a three-dimensional viewing of an event (i.e., corresponding camera views of the event may be displayed on a respective display.

Any given server terminal may include a processor, a memory having at least on set of computer-readable instructions stored thereon and associated with managing powered reclining chairs and venue operations, a network adapter a display and a keyboard. Any given desktop computer may include a processor, a memory 123 having at least on set of computer-readable instructions stored thereon and associated with managing powered reclining chairs and venue operations 124, a network adapter 125 a display 120 and a keyboard 121. Any given mainframe, or central server, system 106 may include a processor 107, a memory 108 having at least on set of computer-readable instructions stored thereon and associated with managing powered reclining chairs and venue operations 109, a network adapter 111 and a customer (or client) database 110. The customer (or client) database 110 may store, for example, chair operation data and/or associated venue data, related to operation of the chair (or a group of chairs) within an associated venue. Any given lap top computer 126 may include a processor, a memory having at least on set of computer-readable instructions stored thereon and associated with managing powered reclining chairs and venue operations, a network adapter, a display and a keyboard. Any given telephone 127 may include a processor, a memory having at least on set of computer-readable instructions stored thereon and associated with managing powered reclining chairs and venue operations, a network adapter, a display and a keyboard.

Any given powered reclining chair supplier 130 may include a desktop computer 131, a lap top computer 138, a tablet computer 139 and a telephone 140. While only one desktop computer 131, only one lap top computer 138, only one tablet computer 139 and only one telephone 140 is depicted in FIG. 1, any number of desktop computers 131, lap top computers 138, tablet computers 139 and/or telephones 140 may be included at any given powered reclining chair supplier 130. Any given telephone 140 may be a land-line connected telephone or a mobile telephone (e.g., smartphone). Any given desktop computer 131 may include a processor 134, a memory 135 having at least on set of computer-readable instructions stored thereon and associated with managing powered reclining chairs and venue operations 136, a network adapter 137 a display 132 and a keyboard 133. Any given lap top computer 138 may include a processor, a memory having at least on set of computer-readable instructions stored thereon and associated with managing powered reclining chairs and venue operations, a network adapter, a display and a keyboard. Any given tablet computer 139 may include a processor, a memory having at least on set of computer-readable instructions stored thereon and associated with managing powered reclining chairs and venue operations, a network adapter, a display and a keyboard. Any given telephone 140 may include a processor, a memory having at least on set of computer-readable instructions stored thereon and associated with managing powered reclining chairs and venue operations, a network adapter, a display and a keyboard.

Any given powered reclining chair technician site 145 may include a desktop computer 146, a lap top computer 153, a tablet computer 154 and a telephone 155. While only one desktop computer 146, only one lap top computer 153, only one tablet computer 154 and only one telephone 155 is depicted in FIG. 1, any number of desktop computers 146, lap top computers 153, tablet computers 154 and/or telephones 155 may be included at any given powered reclining chair technician site 145. Any given telephone 155 may be a land-line connected telephone or a mobile telephone (e.g., smartphone). Any given desktop computer 146 may include a processor 149, a memory 150 having at least on set of computer-readable instructions stored thereon and associated with managing powered reclining chairs and venue operations 151, a network adapter 152 a display 147 and a keyboard 148. Any given lap top computer 153 may include a processor, a memory having at least on set of computer-readable instructions stored thereon and associated with managing powered reclining chairs and venue operations, a network adapter, a display and a keyboard. Any given tablet computer 154 may include a processor, a memory having at least on set of computer-readable instructions stored thereon and associated with managing powered reclining chairs and venue operations, a network adapter, a display and a keyboard. Any given telephone 155 may include a processor, a memory having at least on set of computer-readable instructions stored thereon and associated with managing powered reclining chairs and venue operations, a network adapter, a display and a keyboard.

Any given powered reclining chair site 160 may include a desktop computer 161, a lap top computer 168, a tablet computer 169 and a telephone 170. While only one desktop computer 161, only one lap top computer 168, only one tablet computer 169 and only one telephone 170 is depicted in FIG. 1, any number of desktop computers 161, lap top computers 168, tablet computers 169 and/or telephones 170 may be included at any given powered reclining chair site 160. Any given telephone 170 may be a land-line connected telephone or a mobile telephone (e.g., smartphone). Any given desktop computer 161 may include a processor 164, a memory 165 having at least on set of computer-readable instructions stored thereon and associated with managing powered reclining chairs and venue operations 166, a network adapter 1167 a display 162 and a keyboard 163. Any given lap top computer 168 may include a processor, a memory having at least on set of computer-readable instructions stored thereon and associated with managing powered reclining chairs and venue operations, a network adapter, a display and a keyboard. Any given tablet computer 169 may include a processor, a memory having at least on set of computer-readable instructions stored thereon and associated with managing powered reclining chairs and venue operations, a network adapter, a display and a keyboard. Any given telephone 170 may include a processor, a memory having at least on set of computer-readable instructions stored thereon and associated with managing powered reclining chairs and venue operations, a network adapter, a display and a keyboard. While not shown in FIG. 1, any given set of powered reclining chairs 171, or individual powered reclining chair, may include a programmable controller (e.g., controller 860, 960a, 960b, 1060a, 1060b of FIGS. 8, 9A-B, 10A-B, respectively), a powered reclining chair local control (e.g., local control 270, 370, 470, 870, 970c, 1070c, 1170a-c of FIGS. 2, 3, 4, 8, 9c, 10c, 11A-11C, respectively), and/or any number of linear and/or rotary actuators (e.g., actuator 655, 660, 760, 960b, 1060b, 1065b of FIGS. 6, 7, 9B, 10B, respectively). Furthermore, while not shown in FIG. 1, any given set of powered reclining chairs 171, or individual powered reclining chair, may include a plurality of sensors (e.g., temperature sensor, pressure sensor, limit switch, motion sensor, strain gauge, position sensor, occupancy sensor, load sensor, etc.).

Figure 2A:
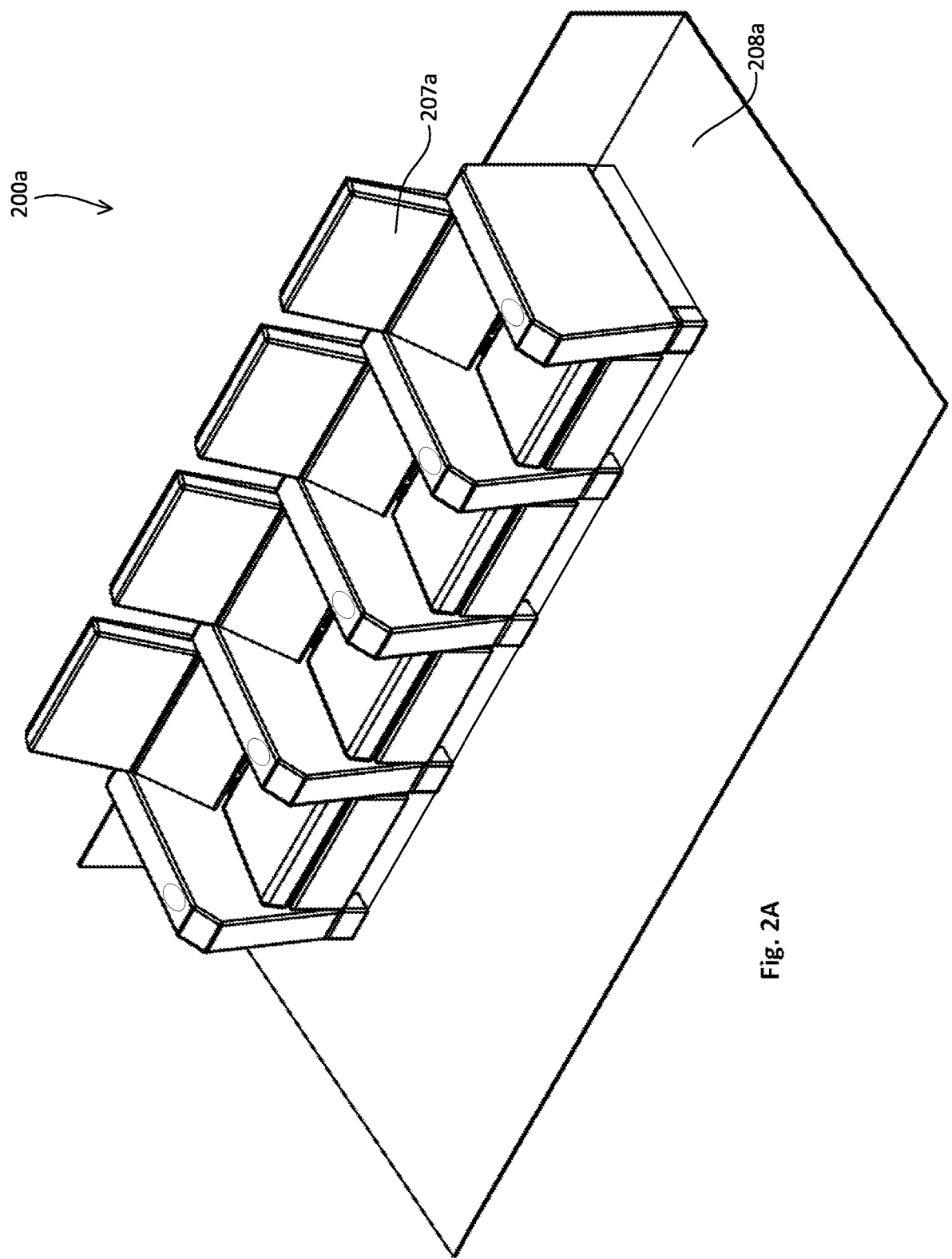
FIGS. 2A and 2B depict perspective views of powered reclining chairs.
Figure 2B:
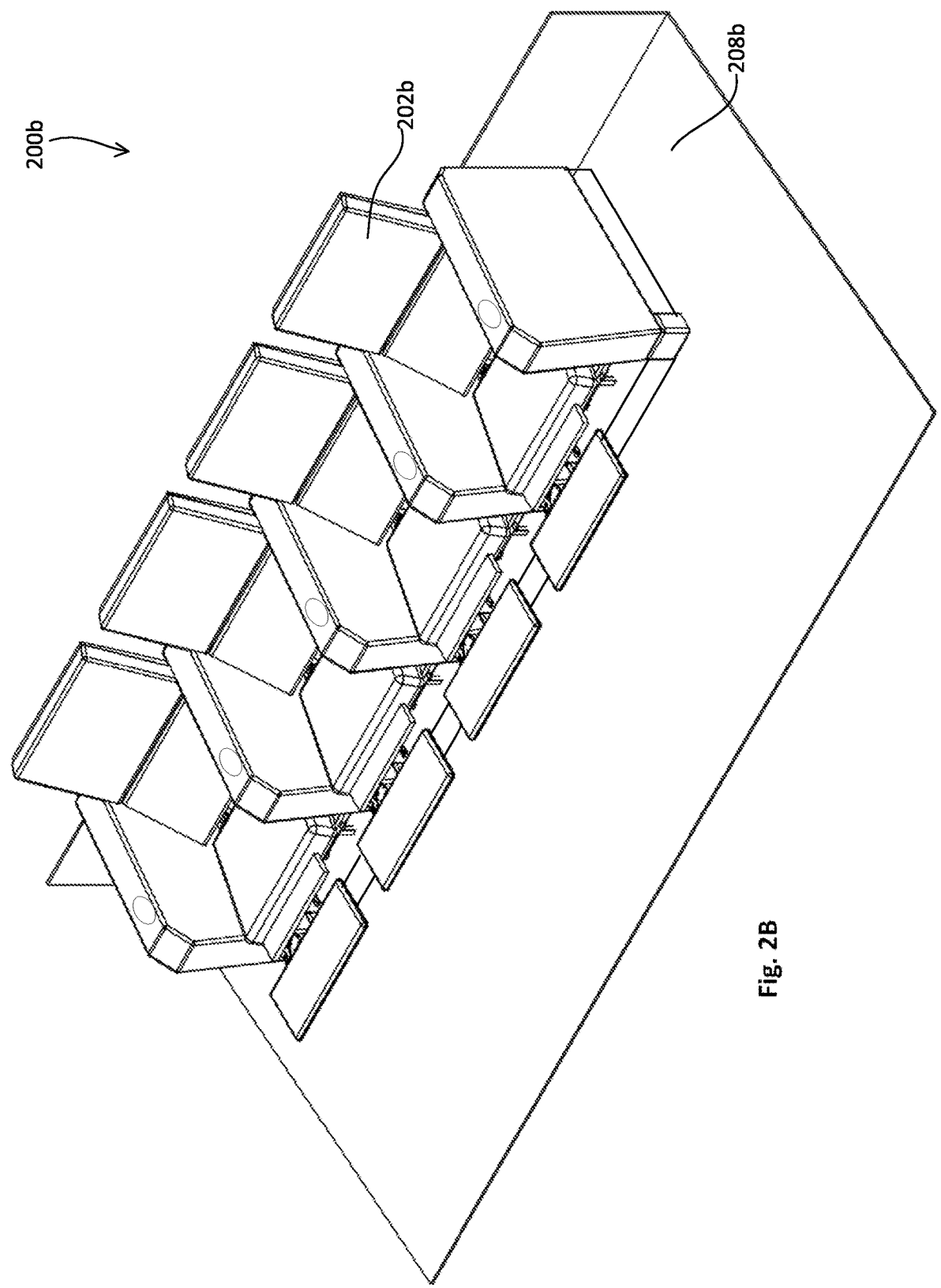

With reference to FIGS. 2A and 2B, a venue 200a, 200b may include a plurality of powered recliner chairs 202a supported on a base (e.g., a floor or a structure) 208a. The powered recliner chairs 202a may be similar to the powered chairs 102 of FIG. 1. Any given powered recliner chair may include a chair back, a lower lumbar support, a chair seat, a foot-rest, and an arm-rest. The arm-rest may include a cup-holder and/or a chair controller. The chair controller may include, for example, a first button to move the respective chair between an upright position (e.g., a chair position as illustrated in FIG. 2A) and a reclined position (e.g., a chair position as illustrated in FIG. 2B). Alternatively, a chair controller may include a plurality of functions, such as, individual buttons associated with independently controlling a chair back, a lower lumbar support, a chair seat, a foot-rest, and/or an arm-rest. Additionally, a chair controller may include an audio output connector, a power output connector, lighting, a microphone, a speaker, etc. Alternatively, a chair controller may be similar to a portable computing device (e.g., portable computing device of FIG. 1) that facilitates a plurality of chair controls and/or venue interaction. A chair controller may include a docking station and/or connection for a smartphone.

Any given reclining chair may be installed such that a surface under the reclining chair is not coplanar with an adjacent walking surface. Examples of such an installation may include: an area directly behind the ottoman raised to make it harder for items to be moved (e.g., kicked or pushed) under the reclining chair; an area directly in front of the reclining chair's rear closure panel may be raised to make it harder for items to be moved (e.g., kicked or pushed) under the reclining chair; and an area under the recliner may be sloped to promote movement of items under the reclining chair moving out from under the reclining chair.

Additionally, a chair controller may include an audio output connector, a power output connector, lighting, a microphone, a speaker, etc. Alternatively, a chair controller may be similar to a portable computing device (e.g., portable computing device of FIG. 1) that facilitates a plurality of chair controls and/or venue interaction. A chair controller may include a docking station and/or connection for a smartphone.

Figures 3A, 3B, 3C:
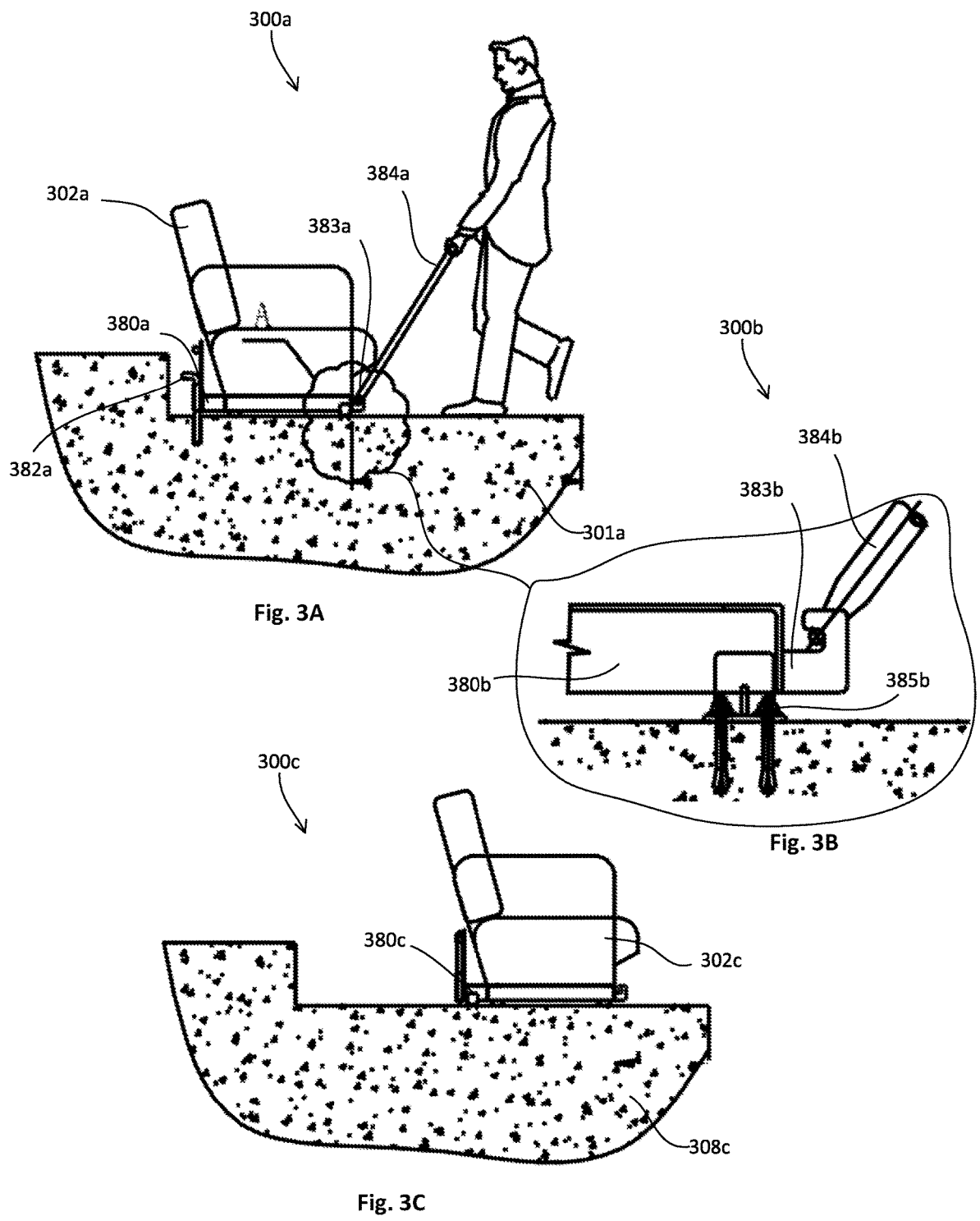
FIGS. 3A-W depict various example linearly repositionable chair assemblies.
Figure 3D:
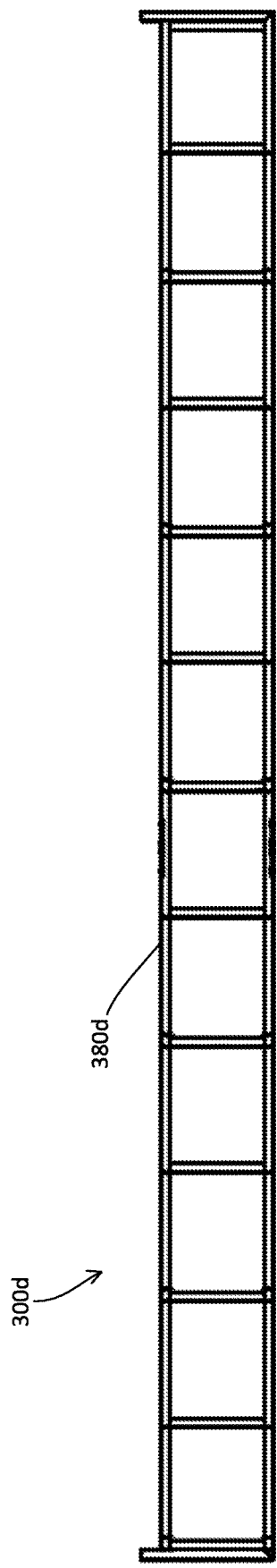
Figure 3E:
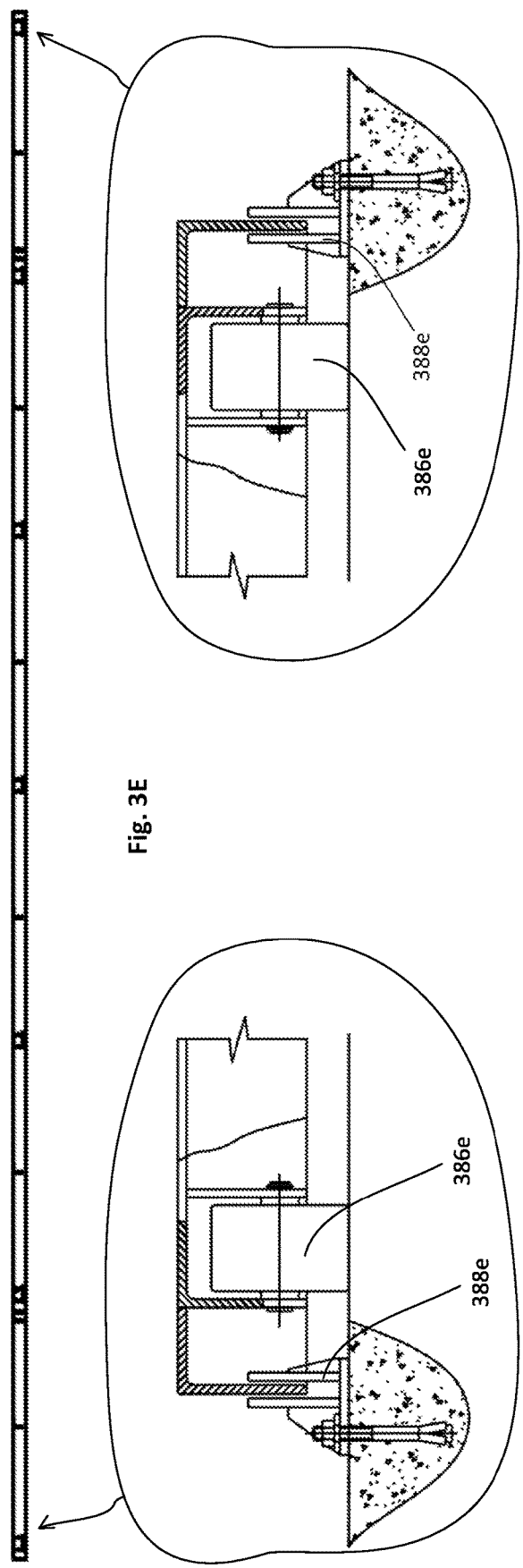
Figure 3H:
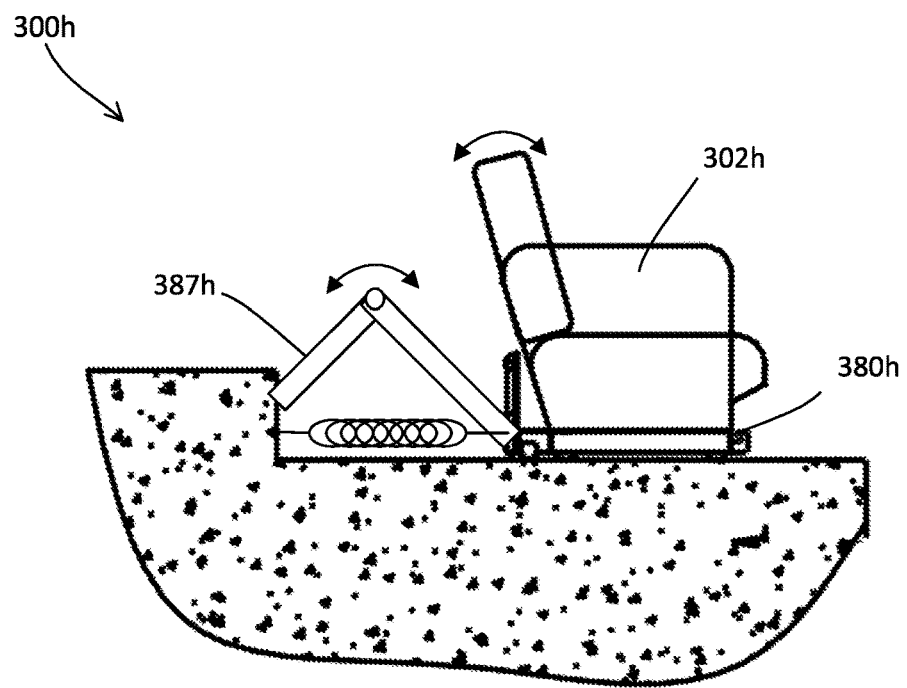
Figure 3I:
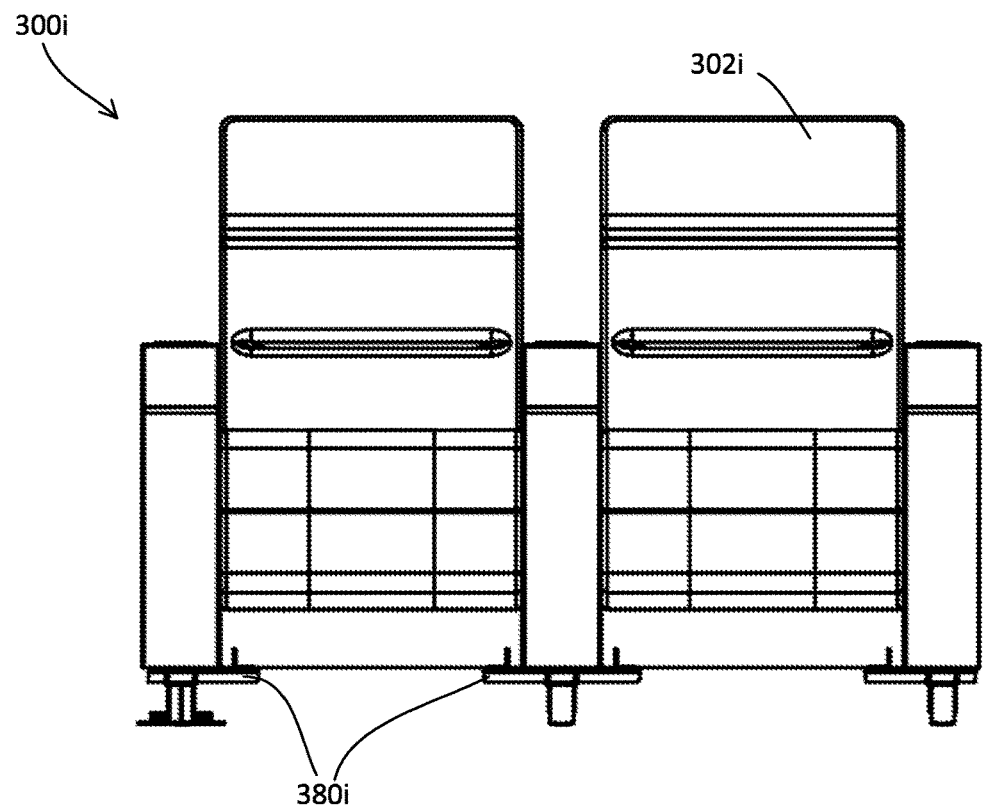
Figure 3J:
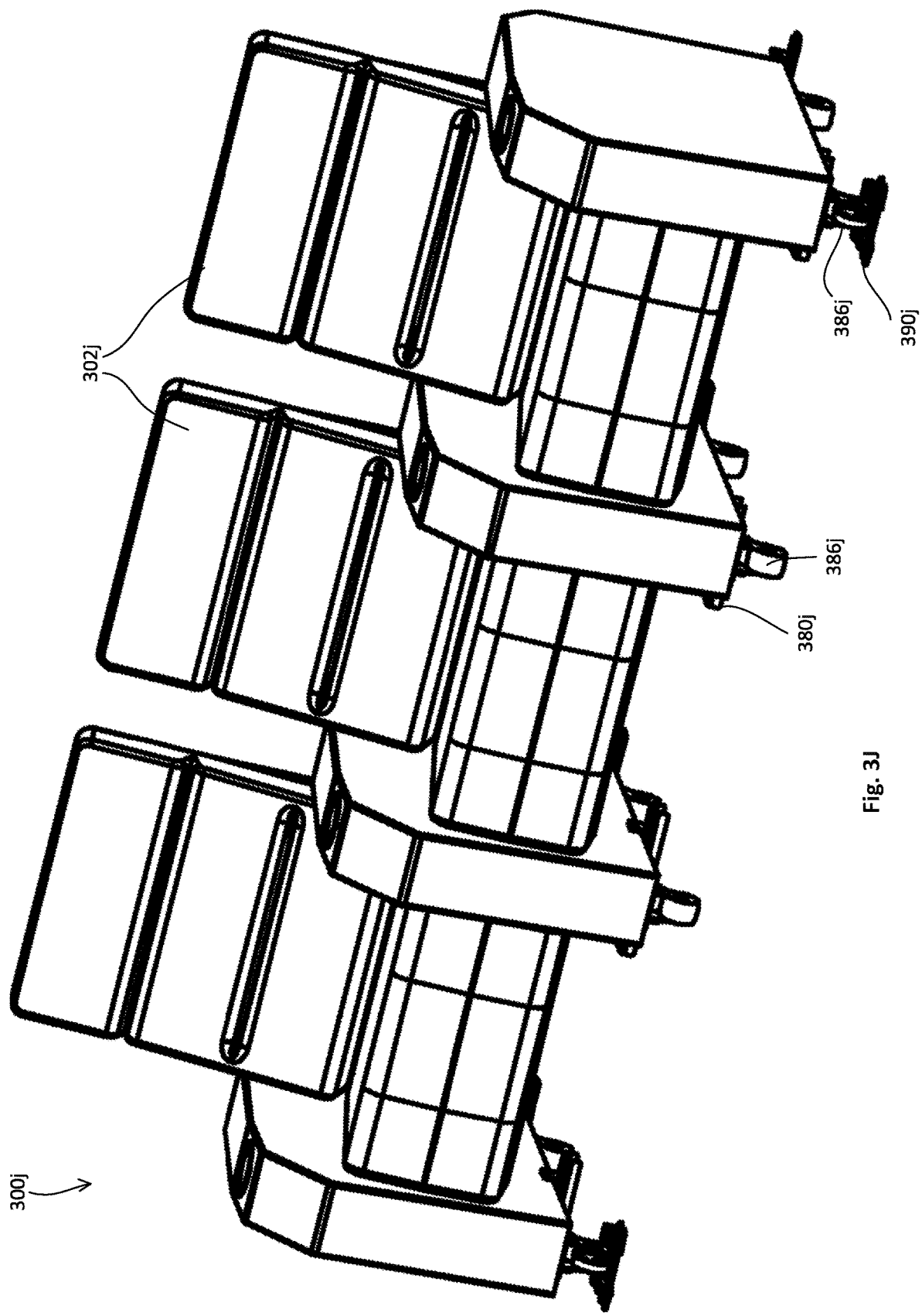
Figure 3L:
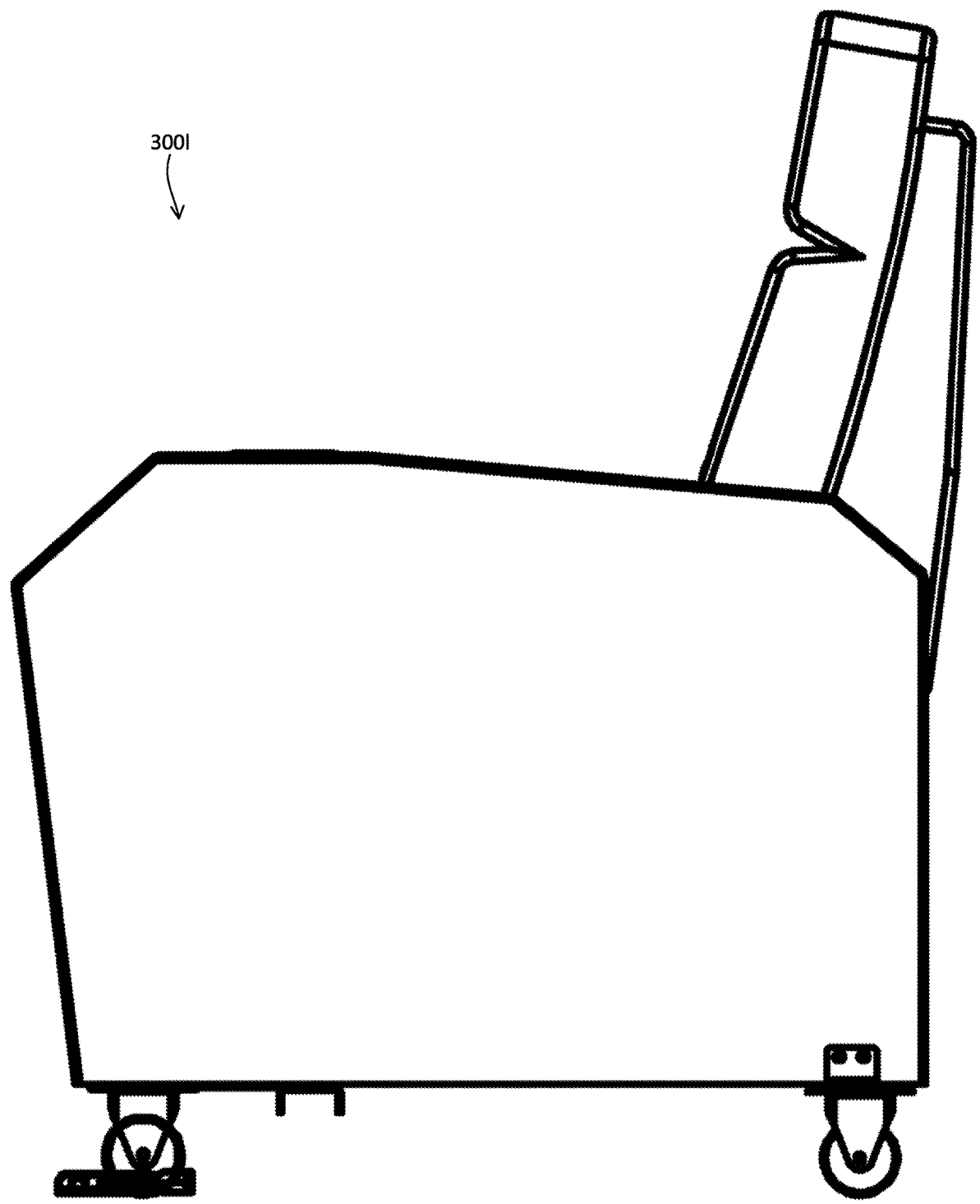
Figure 3M:
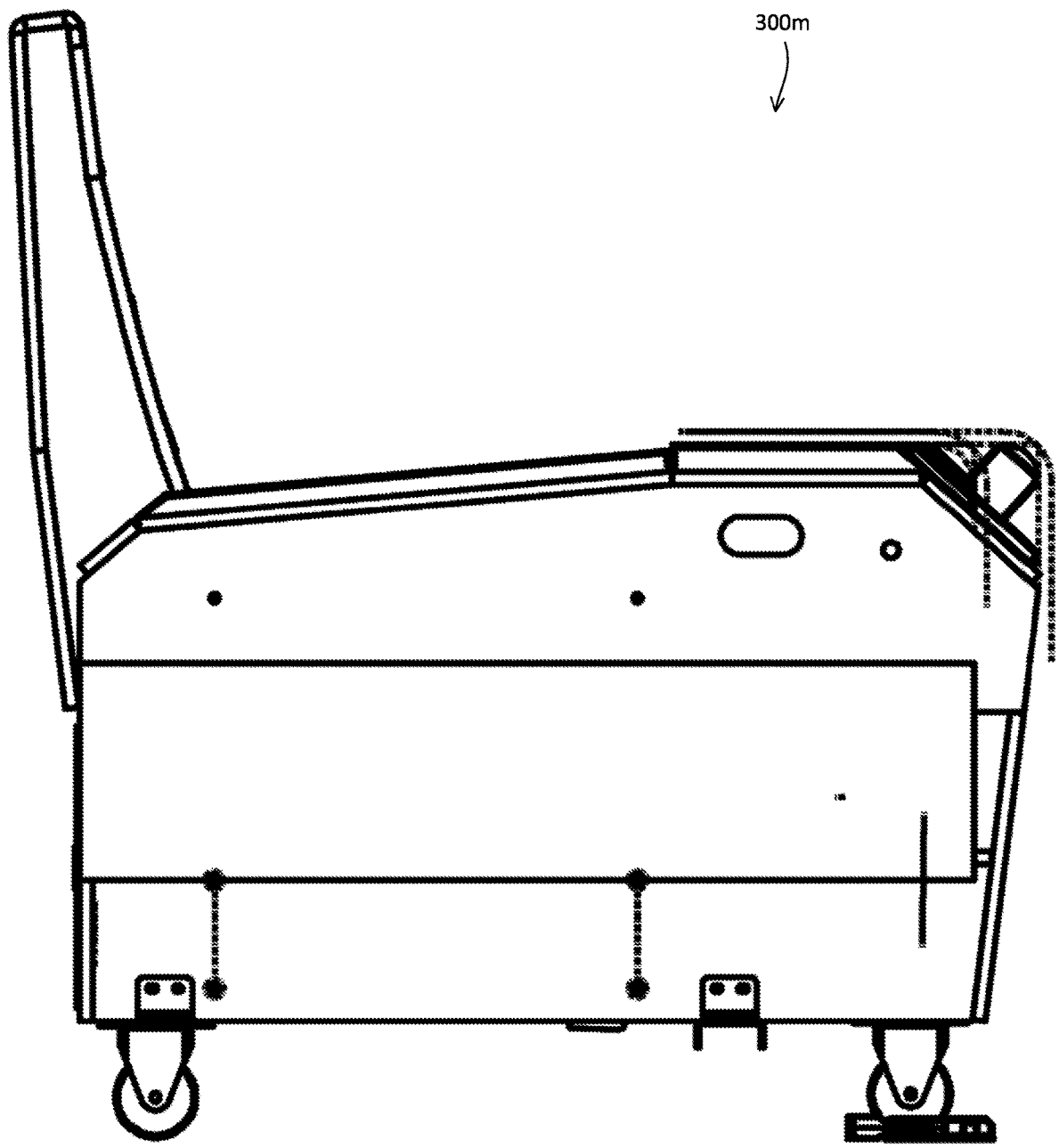
Figure 3N:
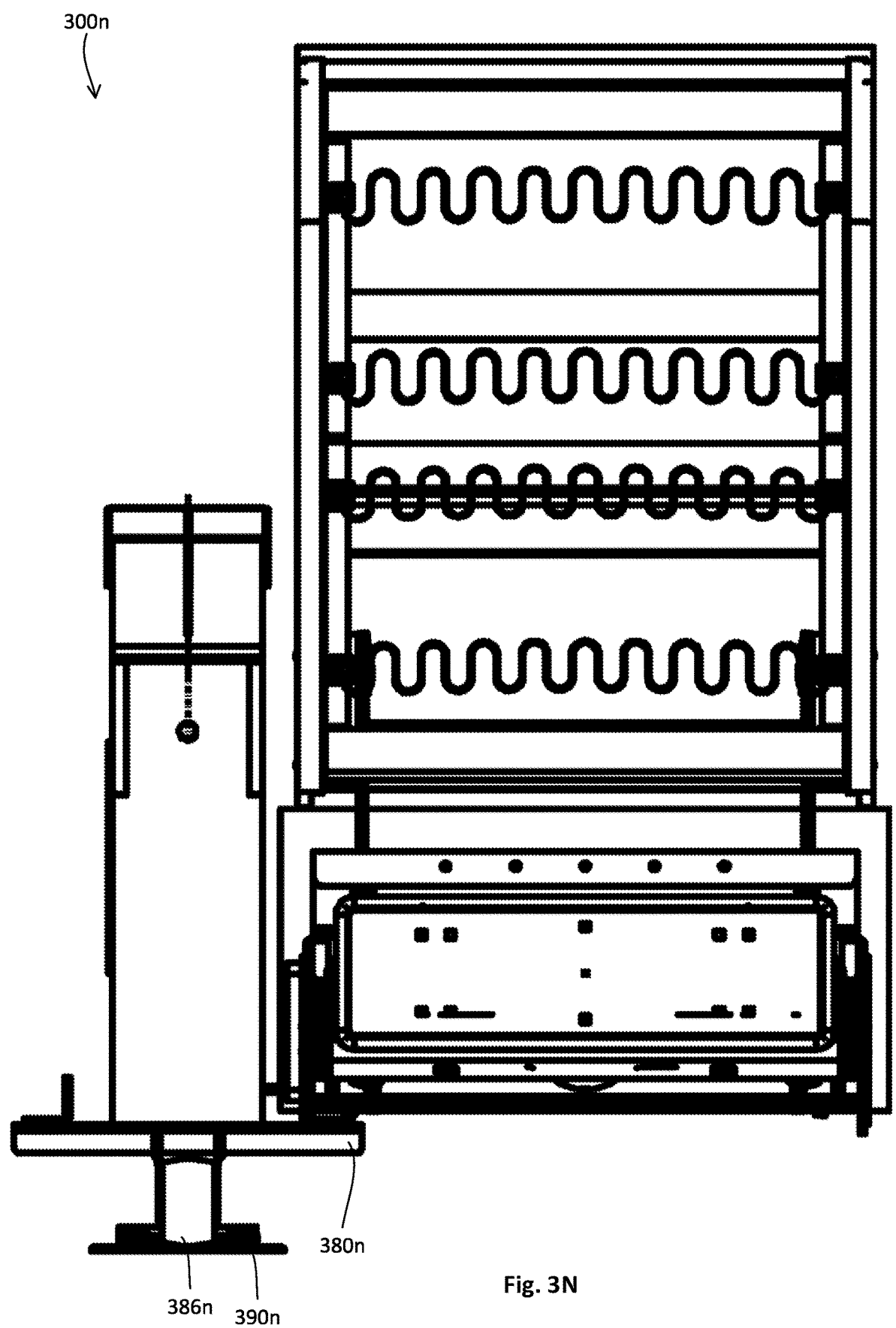
Figure 3O:
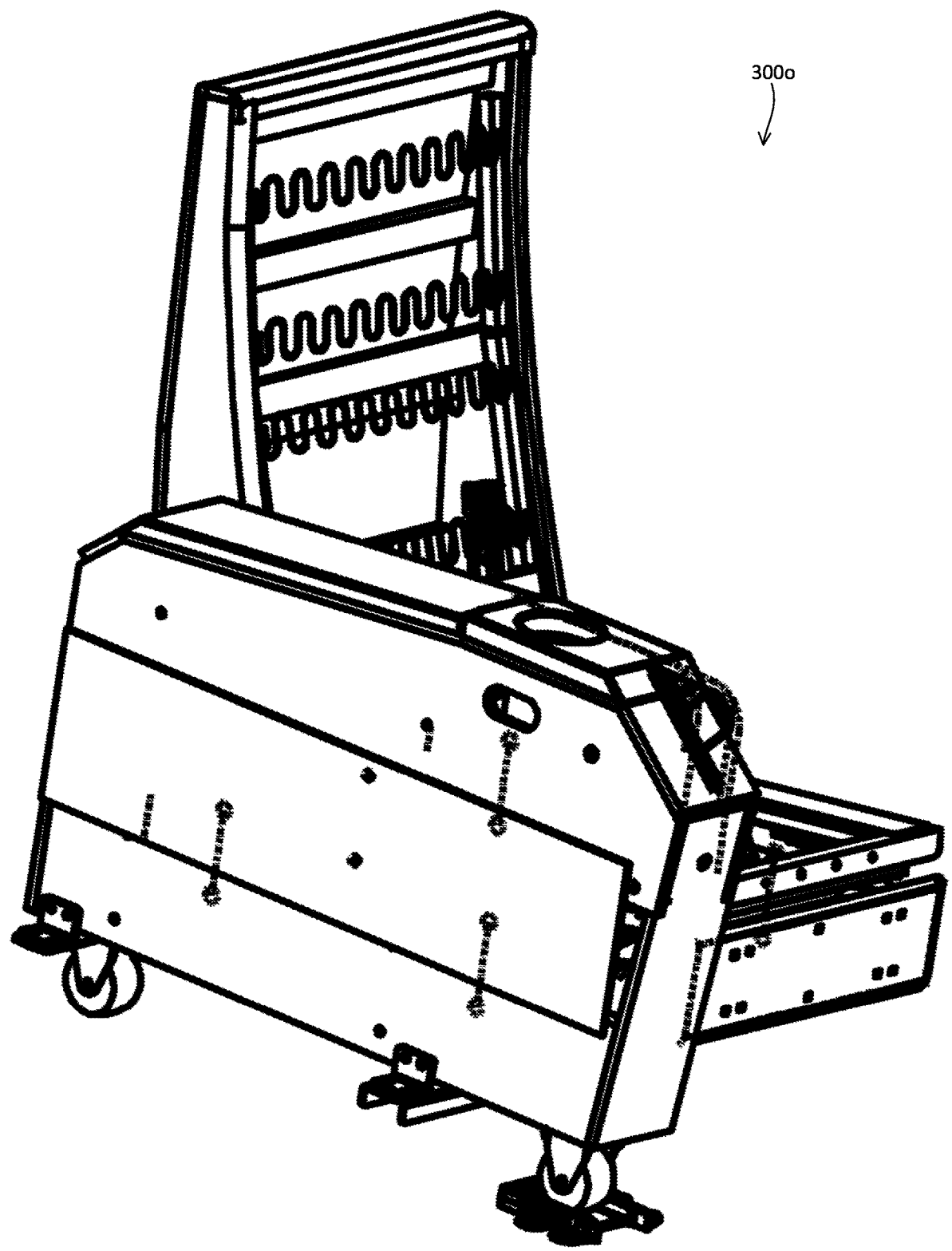
Figure 3P:
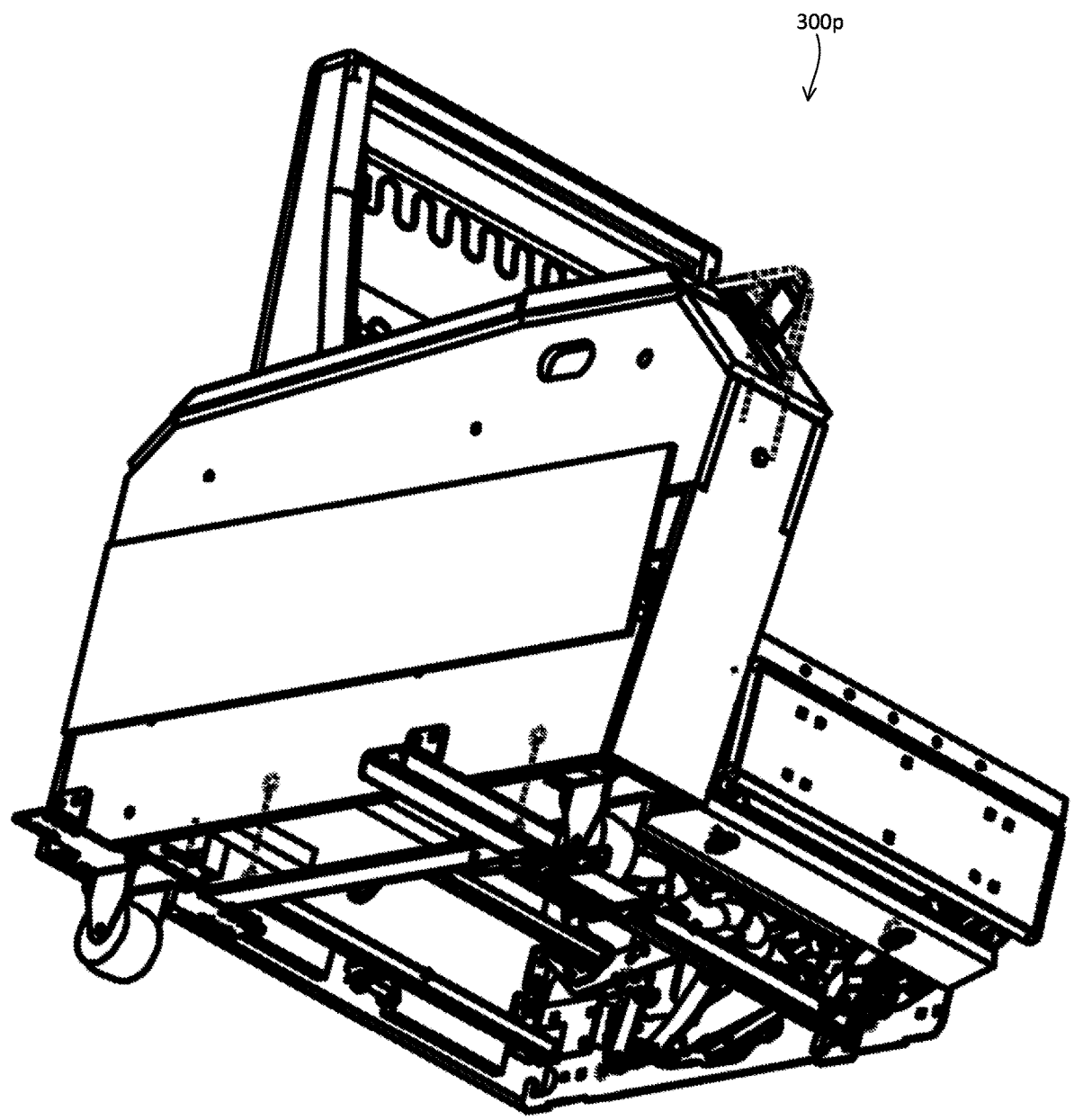
Figure 3Q:
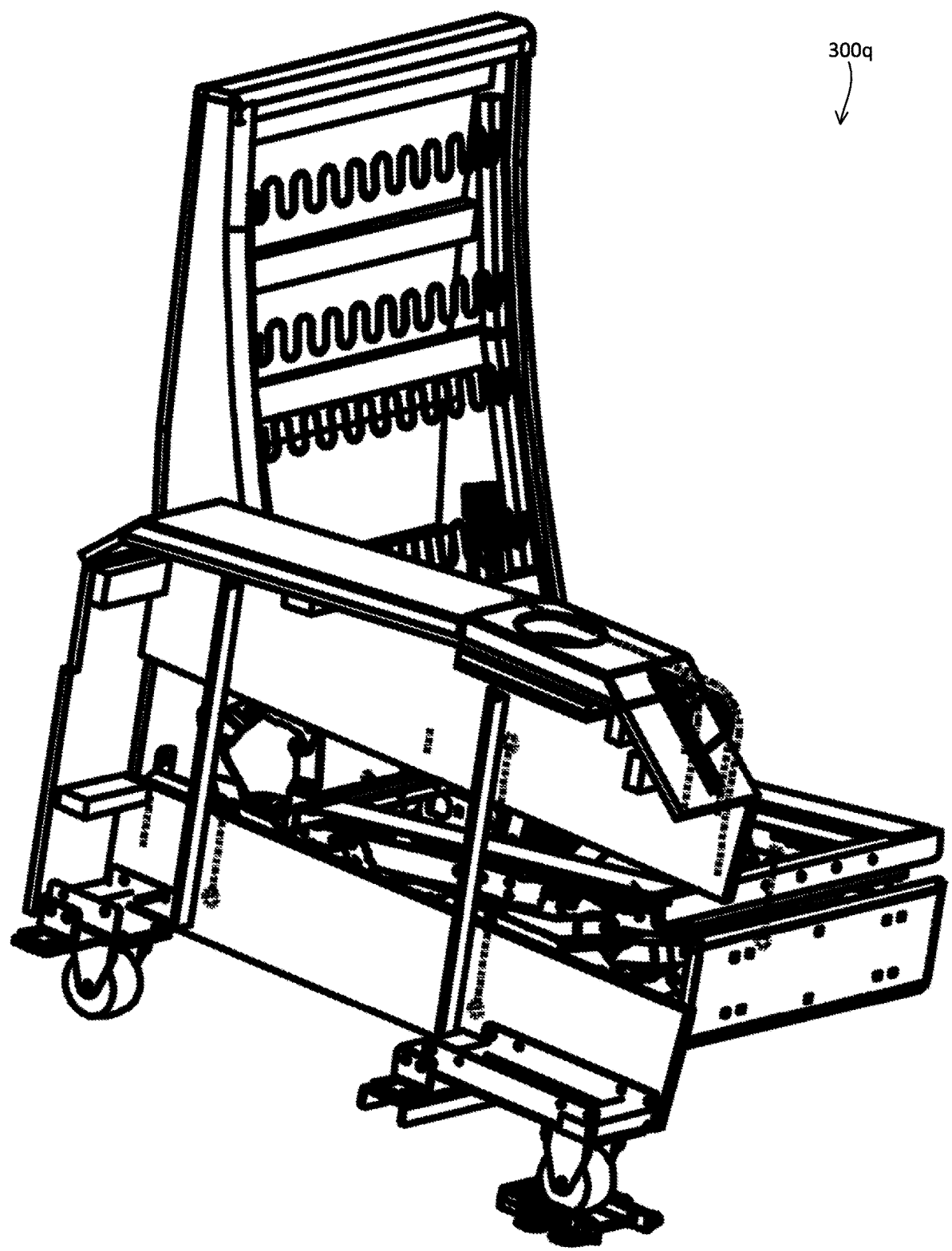
Figure 3R:
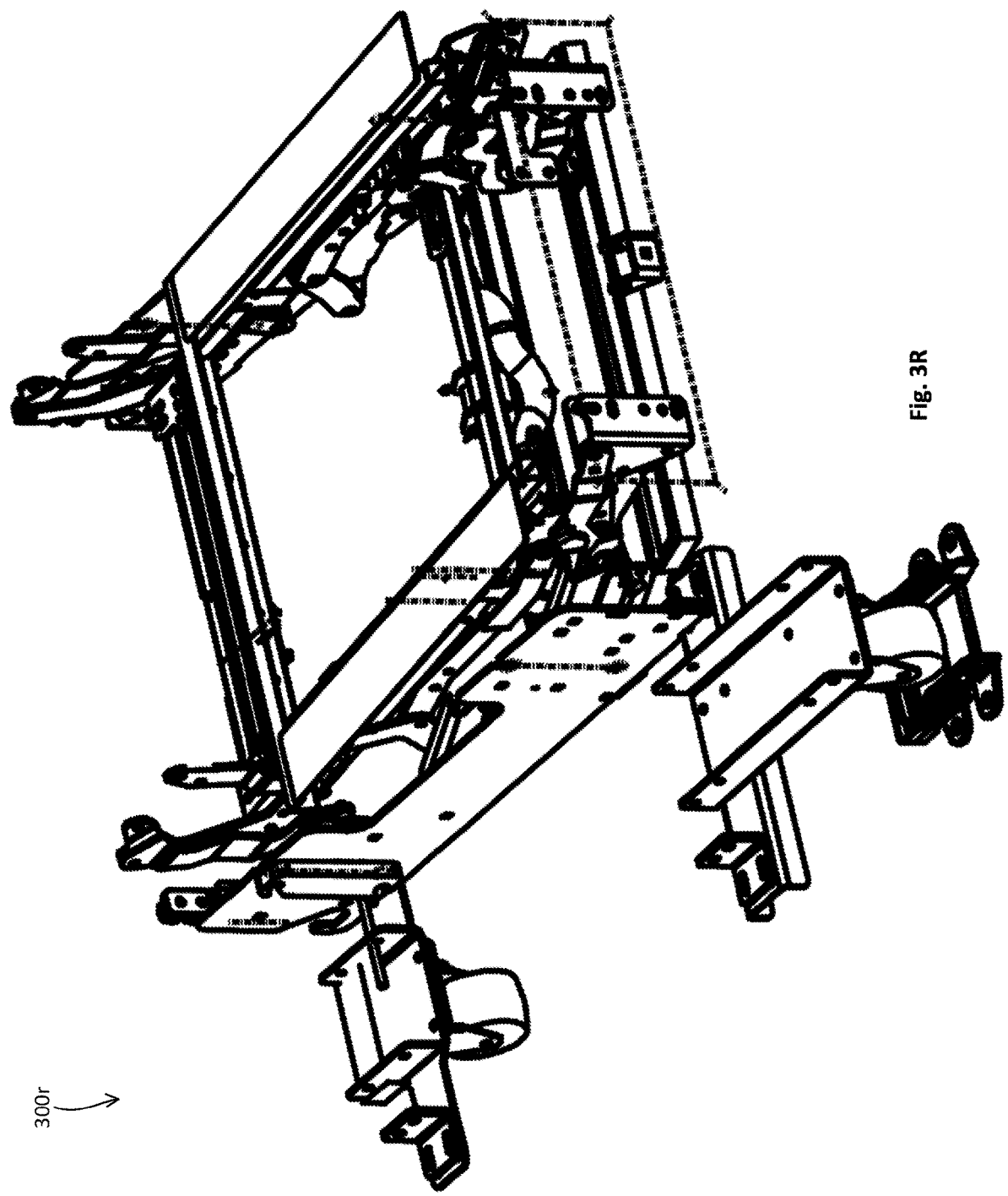
Figure 3S:
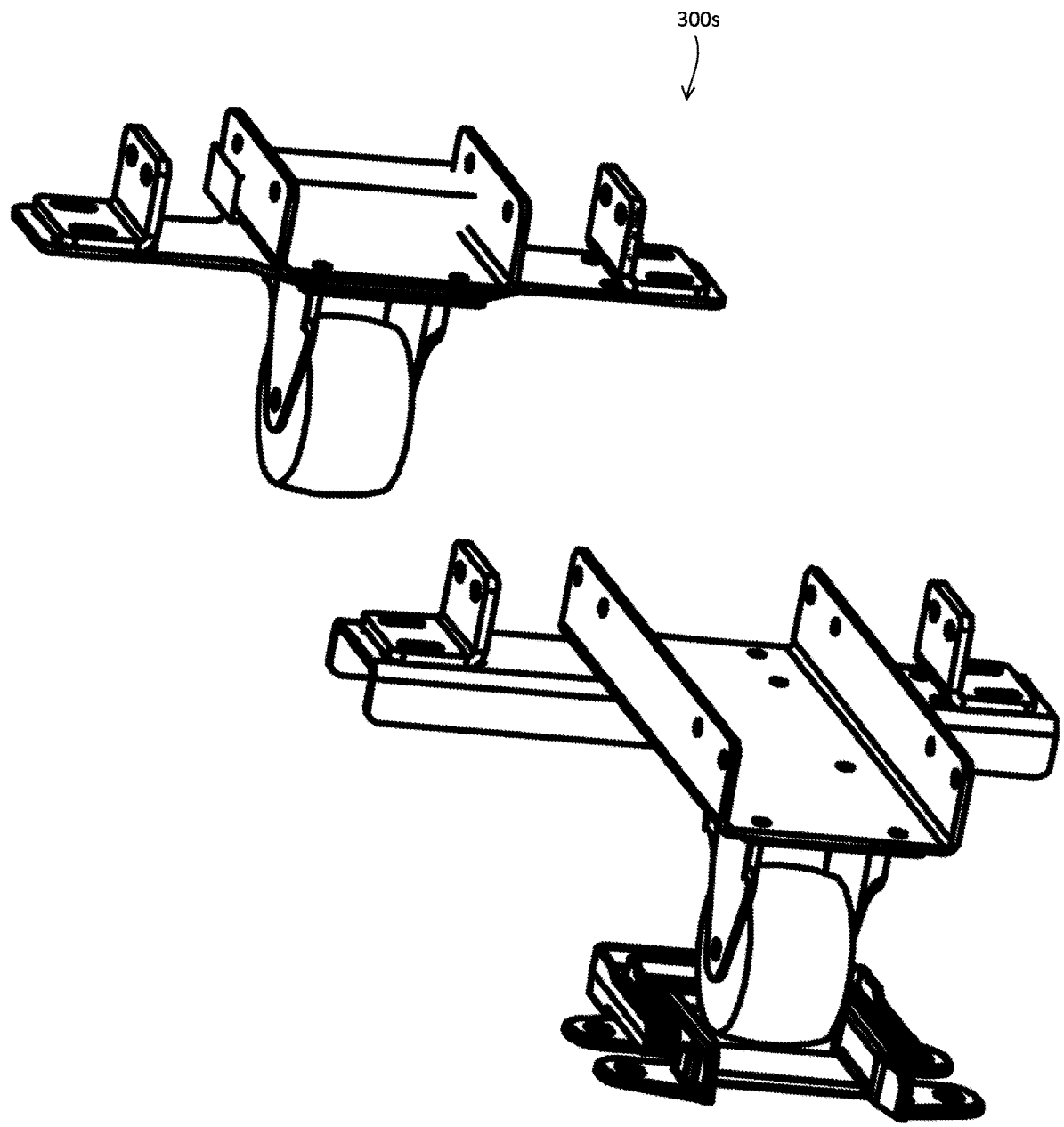
Figure 3T:
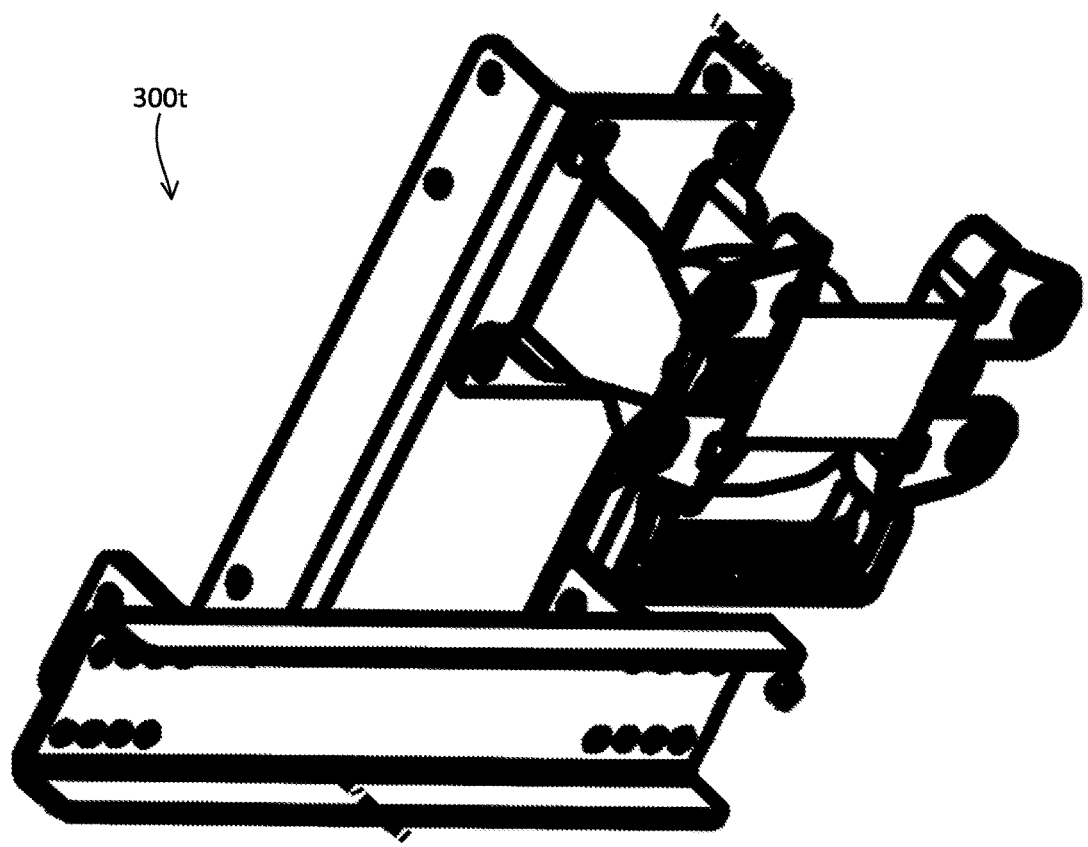
Figure 3U:
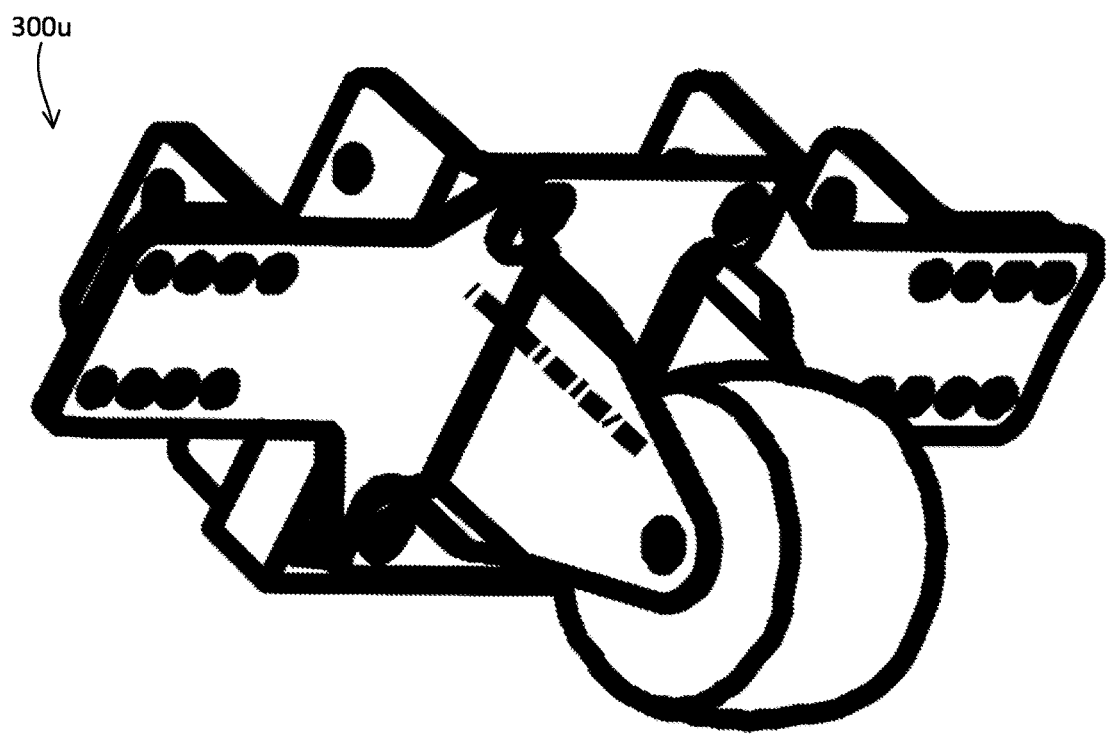
Figures 3V, 3W:
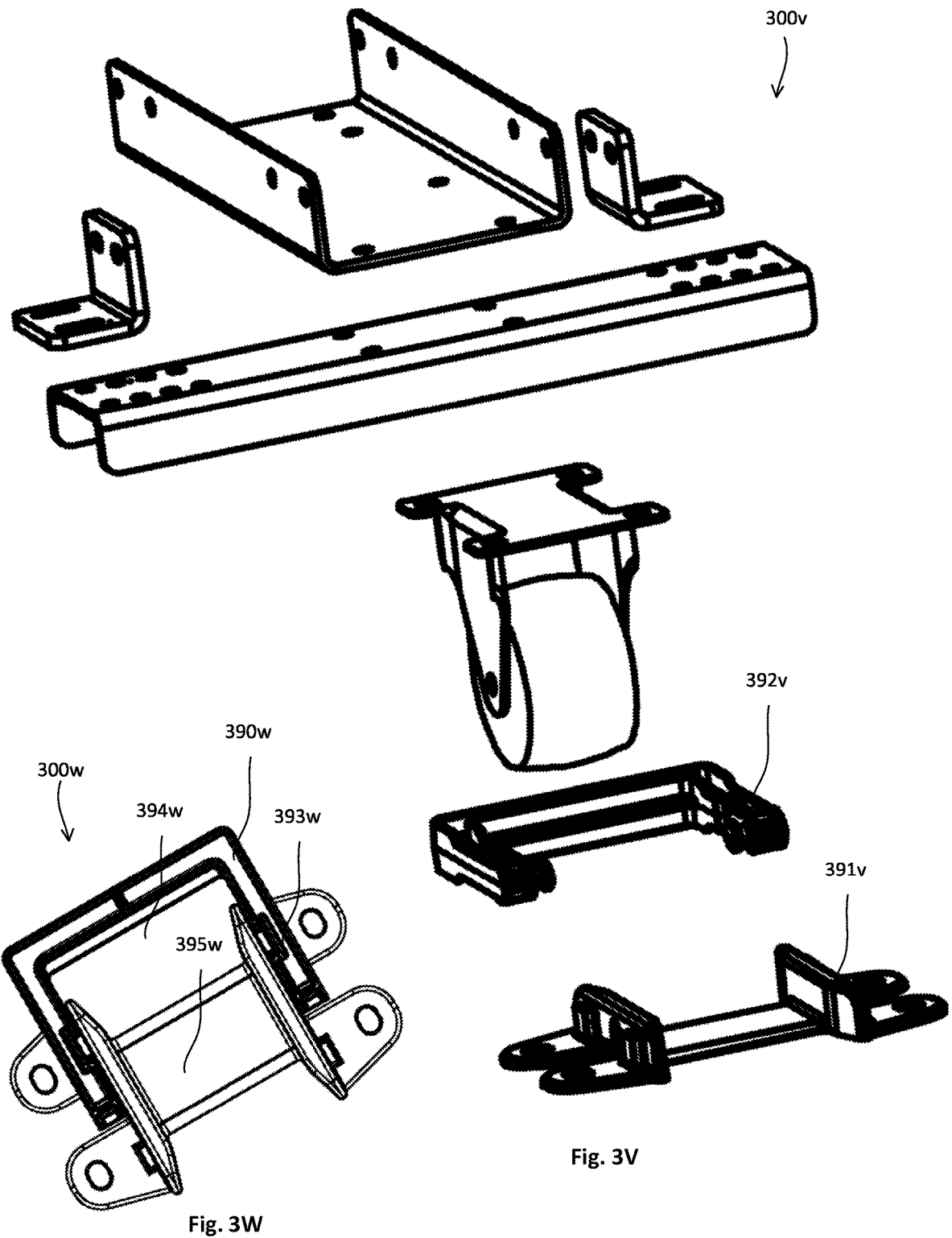

With reference to FIGS. 3A-W, a chair linear repositioning assembly 300a-w may include at least one chair (I, a stationary chair with a folding seat, a rocker style chair, a powered recliner chair, etc.) 371a-w mounted to a linear movement frame 480a-c. As can be seen by comparing the chair rearward linear position of FIG. 3A with the chair forward linear position 3C, the frame 380a-c may be secured via a rearward pin 382a and/or forward pins 385b. As illustrated in FIGS. 3A and 3B, the chair assembly may be manually moved in a linear direction via, for example, a tool 384a,b and a hook 383a,b. Alternatively, or additionally, a chair assembly 300a-c may be configured for automatic linear movement using at least one actuator connected to a control input (e.g., a remote venue cleaning system, etc.).

Turning to FIGS. 3C-E, a linear chair movement assembly 300c-e may include a frame 380c-e having a plurality of wheels or slides 386b-e. The linear chair movement assembly 500a-e may also include a set of guides 388b. In one embodiment, at least one actuator 695 may be connected, for example, in a center area of frame 380a-e and configured to move the frame 580a-e a linear forward and backward motion. As shown in FIG. 3C and D, a group of twelve chairs may be, for example, supported on a single frame (i.e., all twelve chairs may move linearly forward/backward together).

With reference to FIGS. 3H and 3I, an assembly for linear relocation of a plurality of chairs 300h,i may include an electrical umbilical cord 387h to provide power to a chair 371a,i, or group of chairs. As an example, a single venue electric outlet may be configured to power up to twelve chairs down a respective row in a first direction, and power up to twelve more chairs down the respective row in a second direction. Each chair 371h,i may include a recliner mechanism mounted to a frame 380a-e (e.g., pivotally for lift chair, fixed, etc.). Respective arm boxes may be, for example, removable secured to either the frame 380a-e or a respective recliner mechanism (e.g., as disclosed in the commonly owned patents/patent applications that are incorporated herein by reference).

A length of an arm box mounting structure 380a may be chosen depending on a chair seat width and/or an arm box width. As can be seen, the arm box mounting structure 380a may be connected to a side plate of at least one reclining mechanism (respective side plates of two different reclining mechanisms when located between two chair assemblies.).

With further reference to FIGS. 3V and 3W, a wheel chock 390w may include a floor bracket 391w having a ramp 395w and a pivot 392v. The pivot 392v and the ramp 395w may define a wheel socket 394w configured to receive a wheel 386. The pivot 392v may be pivoted to a rear position as illustrated in FIGS. 3V and 3W to receive a front wheel of a chair assembly. The pivot 392v may be pivoted to a front position to receive a rear wheel of a chair assembly once the chair assembly is moved forward. The wheel chock 390w may include at least one engagement 393w configured to strengthen the wheel chock to withstand physical stresses subjected by linear movement of an associated chair assembly In addition to connecting to power/data outlets, the electrical umbilical cord 387h may connect to lighting and other electrical devices as described in, for example, the commonly owned patents/patent applications that are incorporated herein by reference.

Figure 4A:
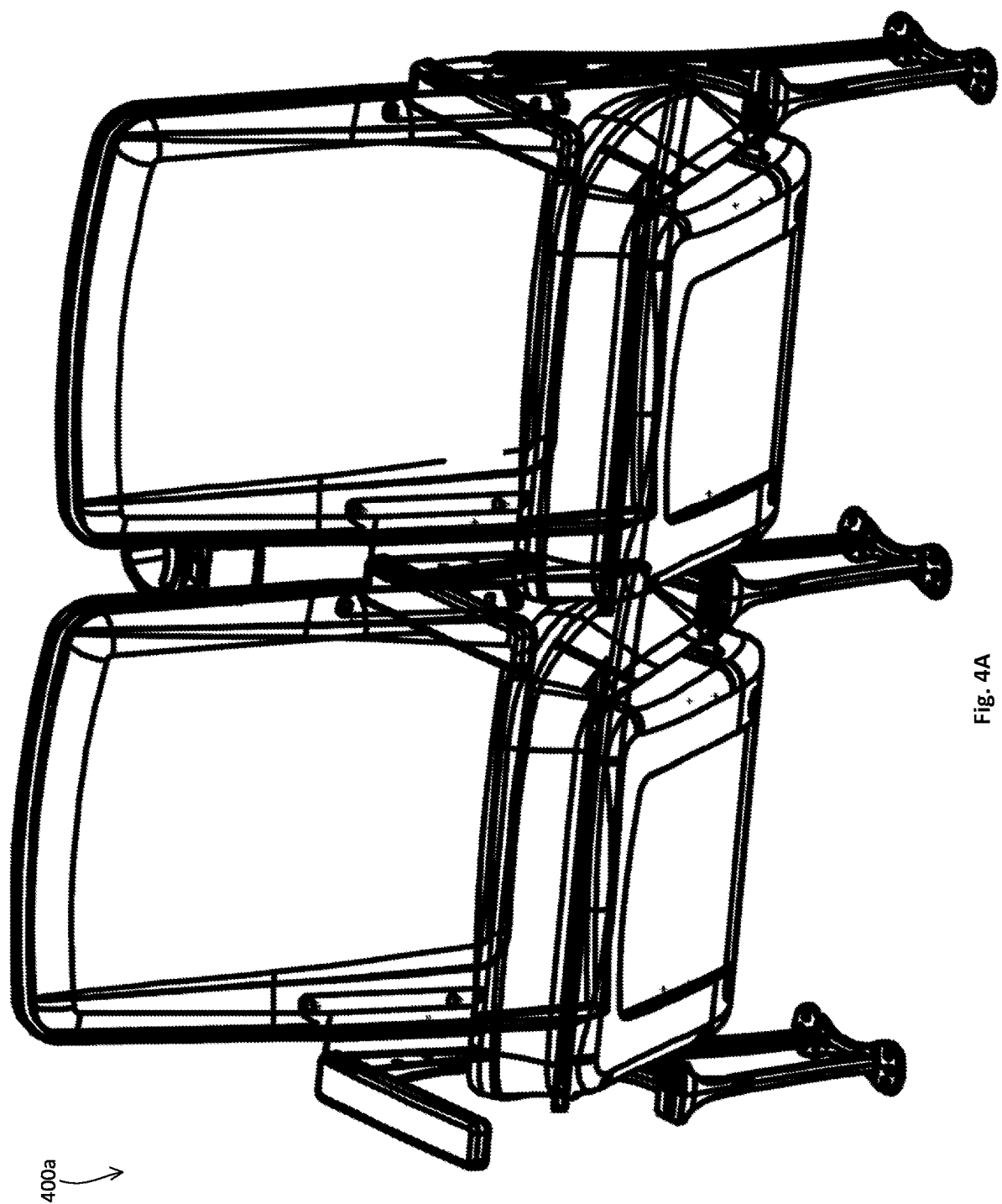
FIGS. 4A-I depict various views of an example cub holder for attachment to chair assemblies.
Figure 4B:
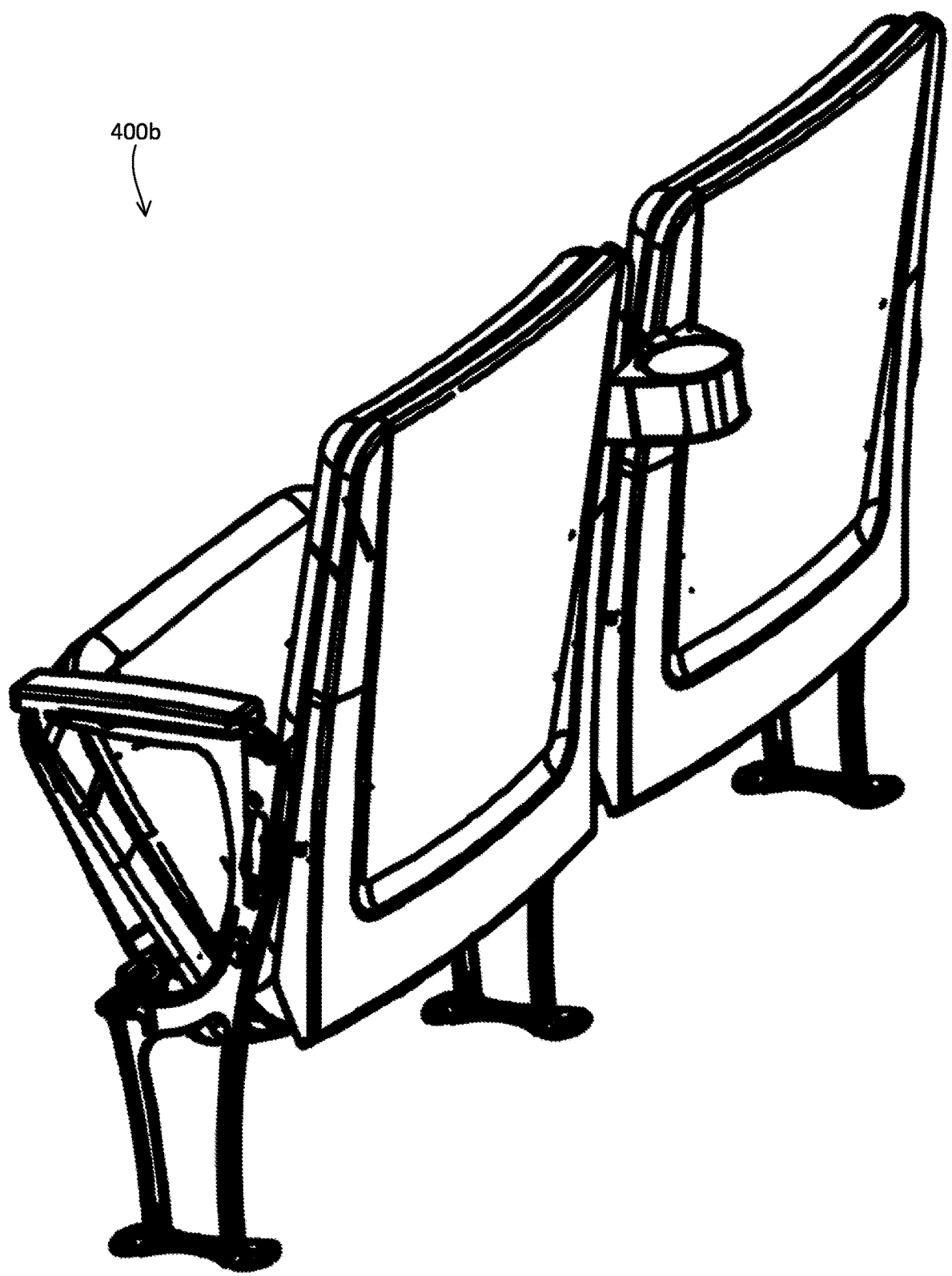
Figure 4C:
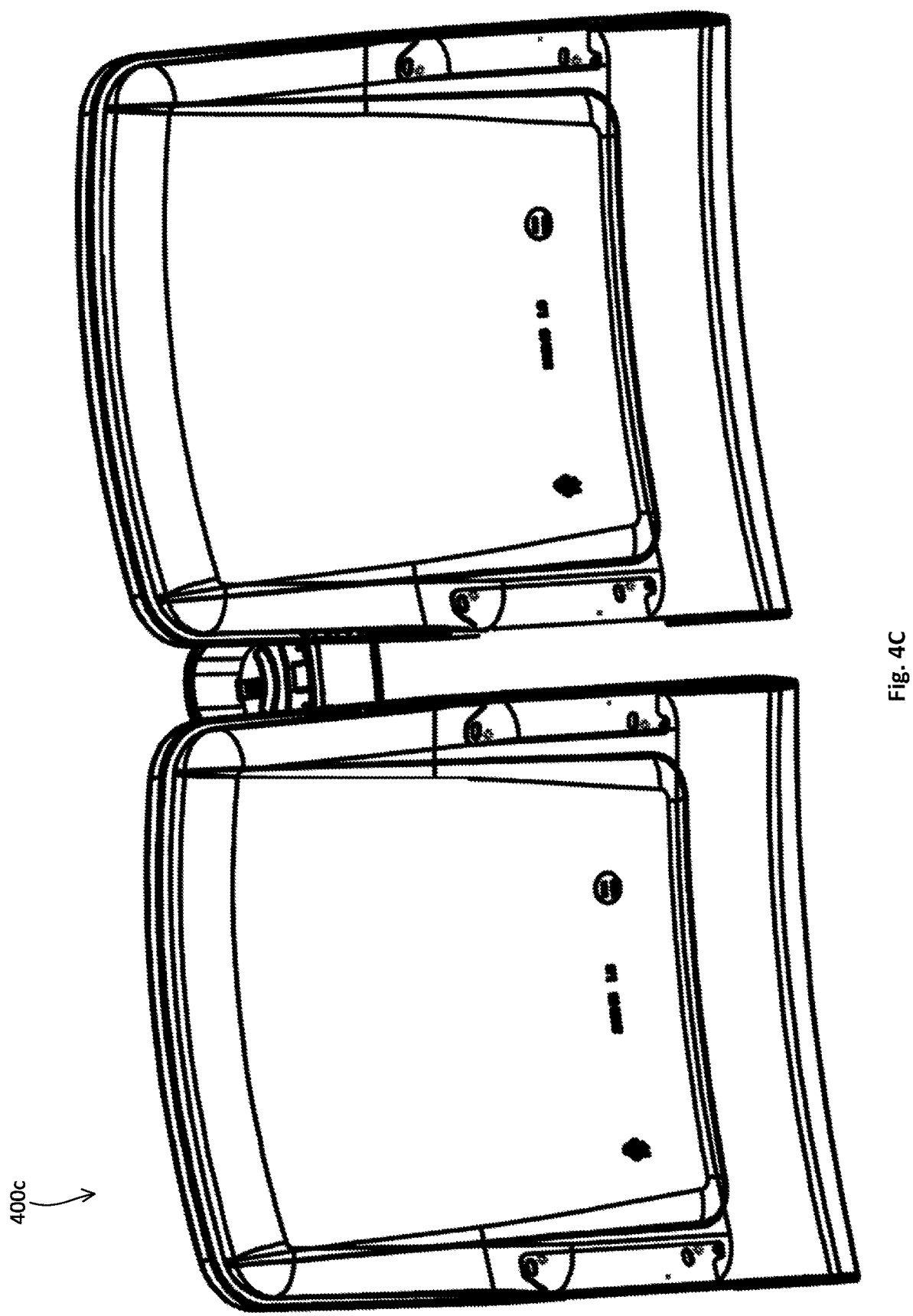
Figure 4D:
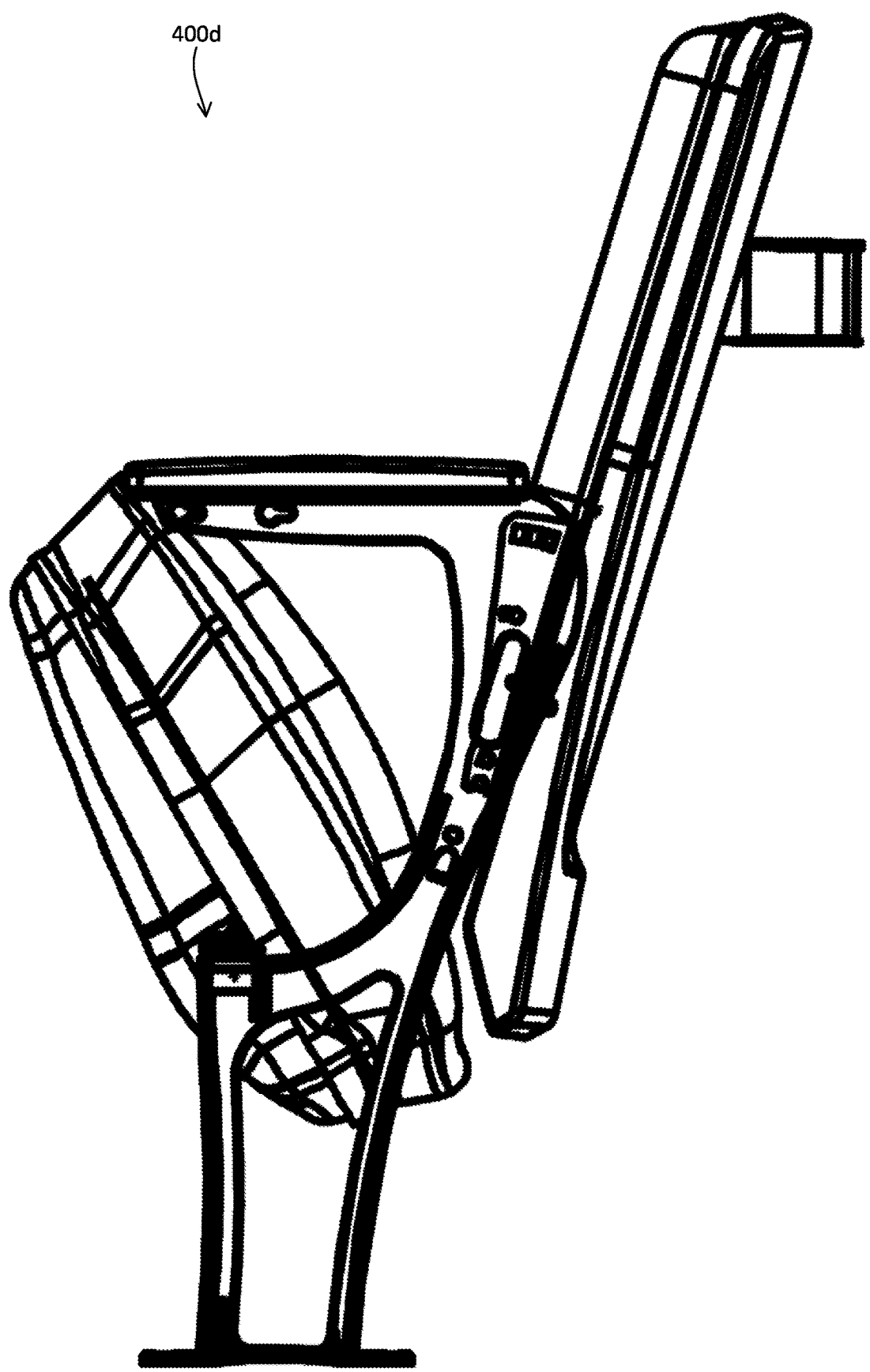
Figure 4E:
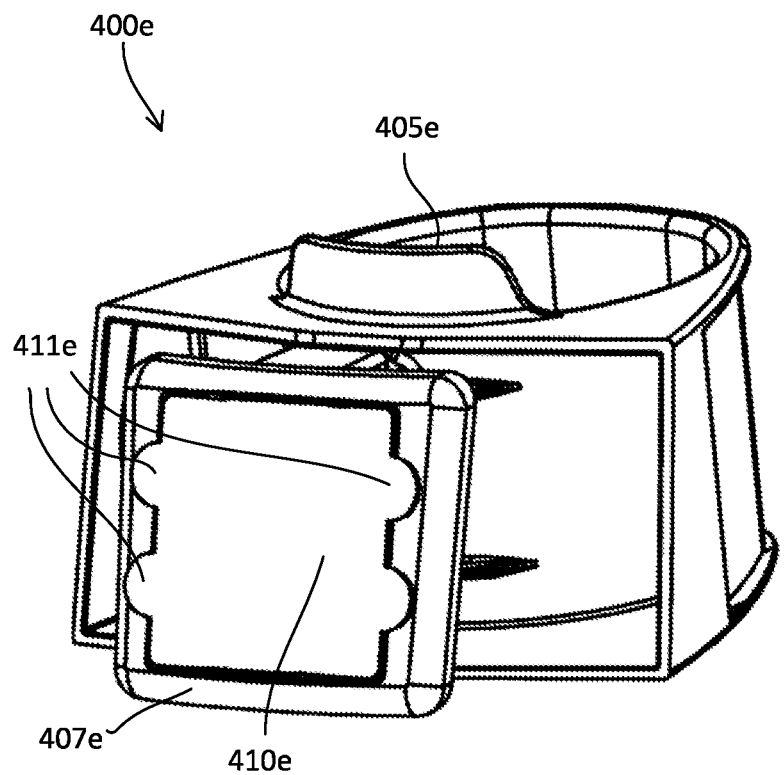
Figure 4F:
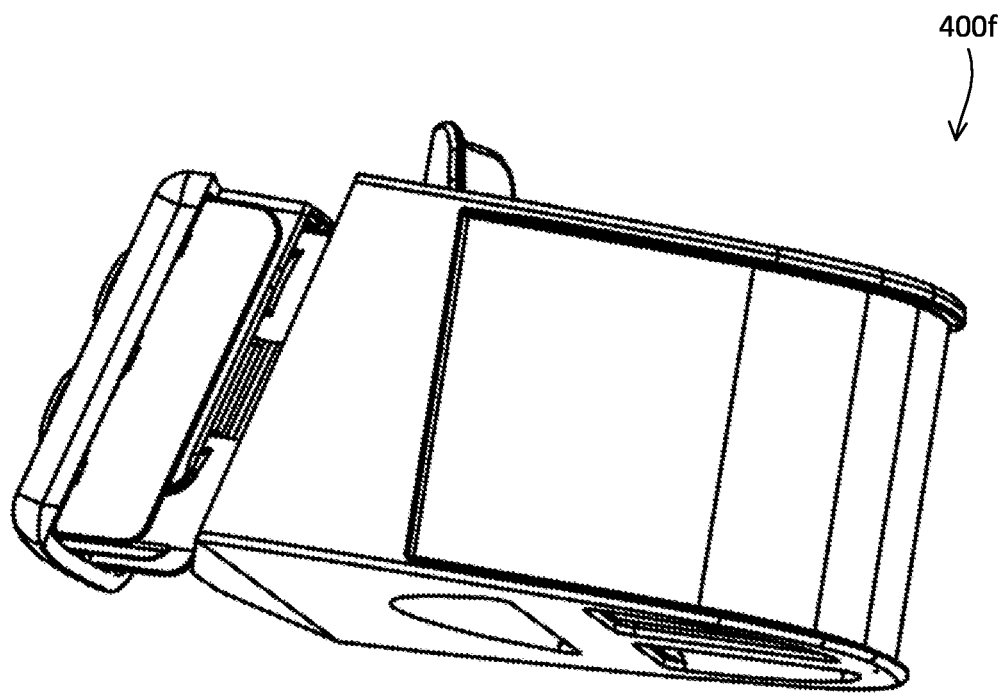
Figure 4G:
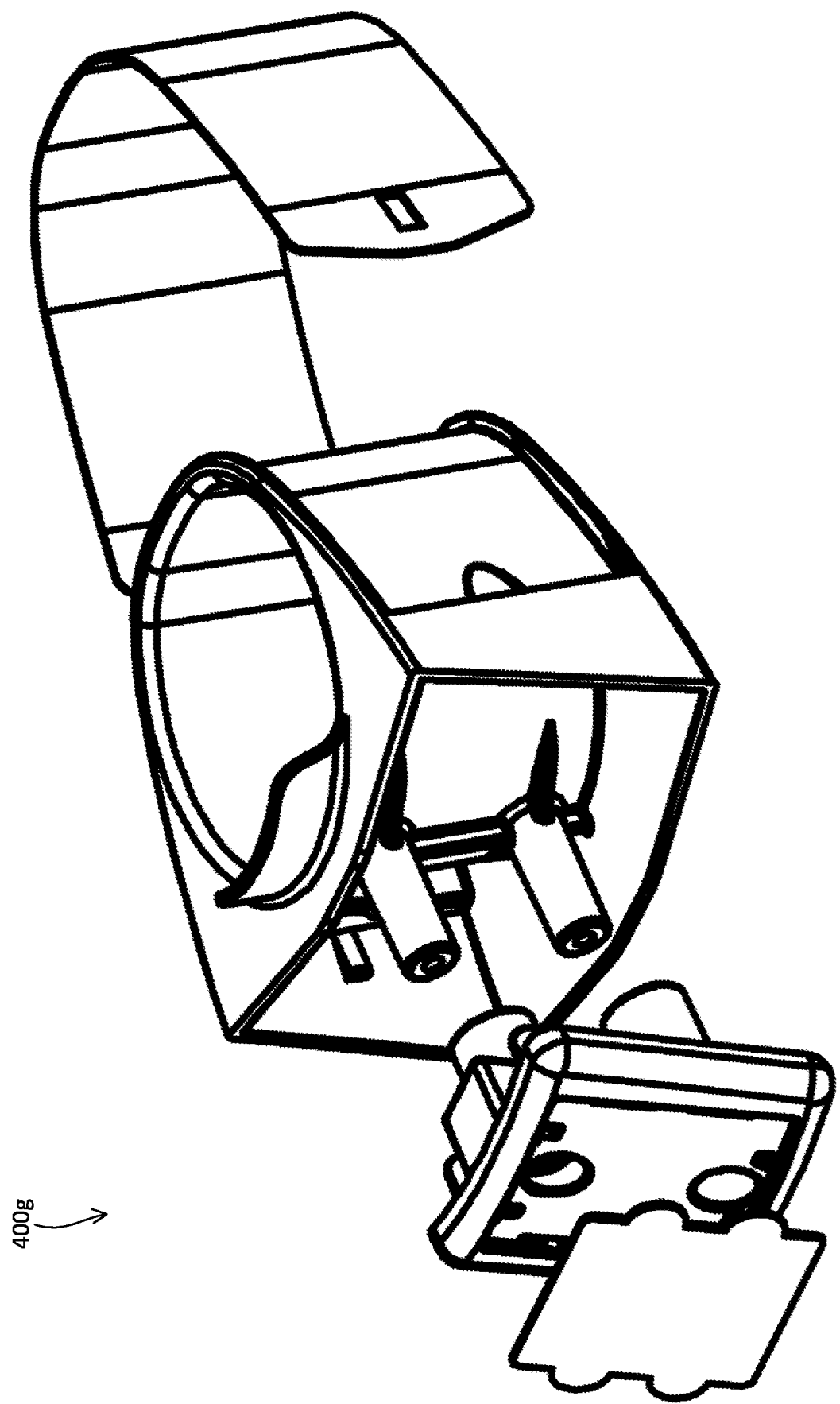
Figure 4H:
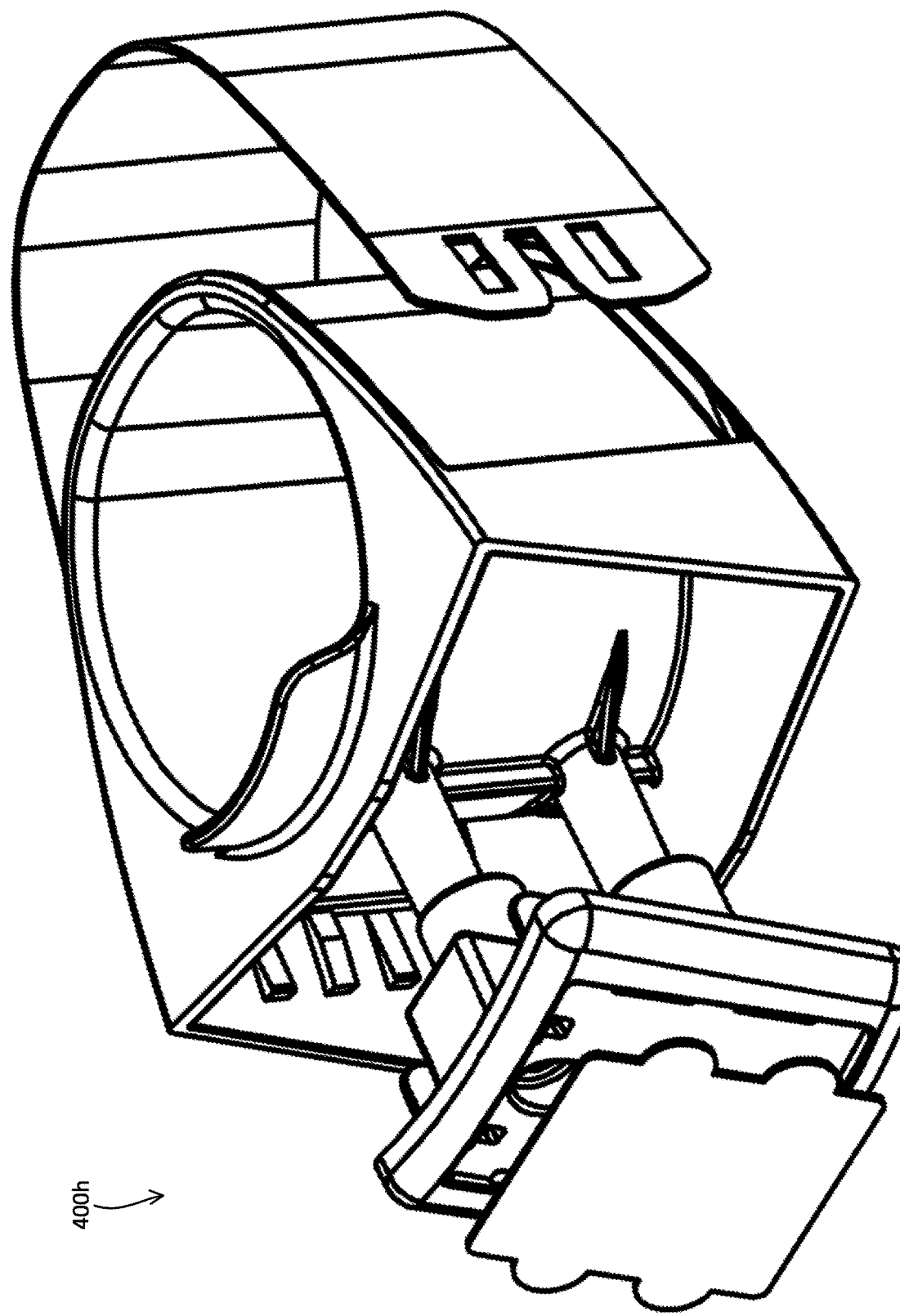
Figure 4I:
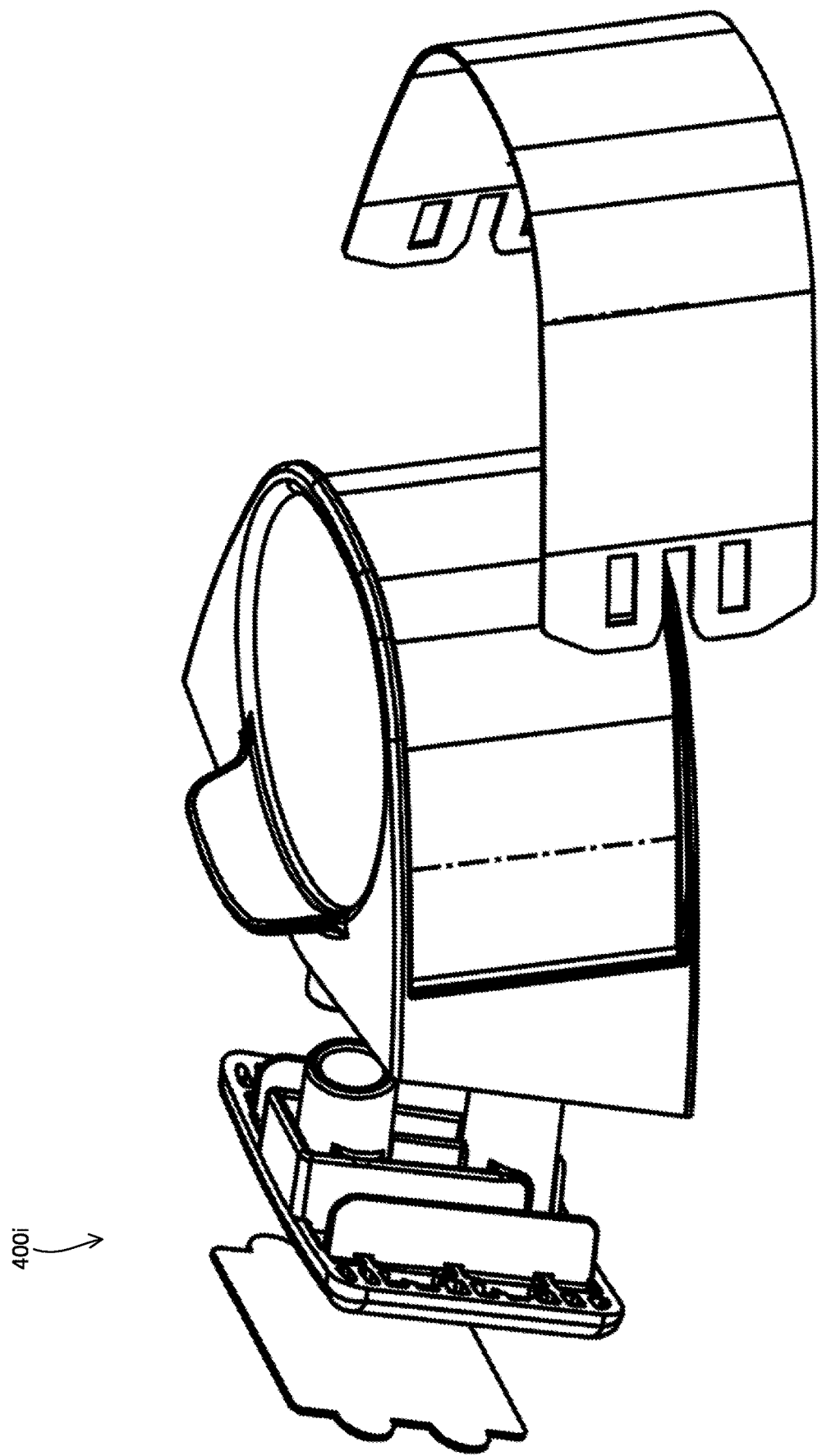
Figure 5A:
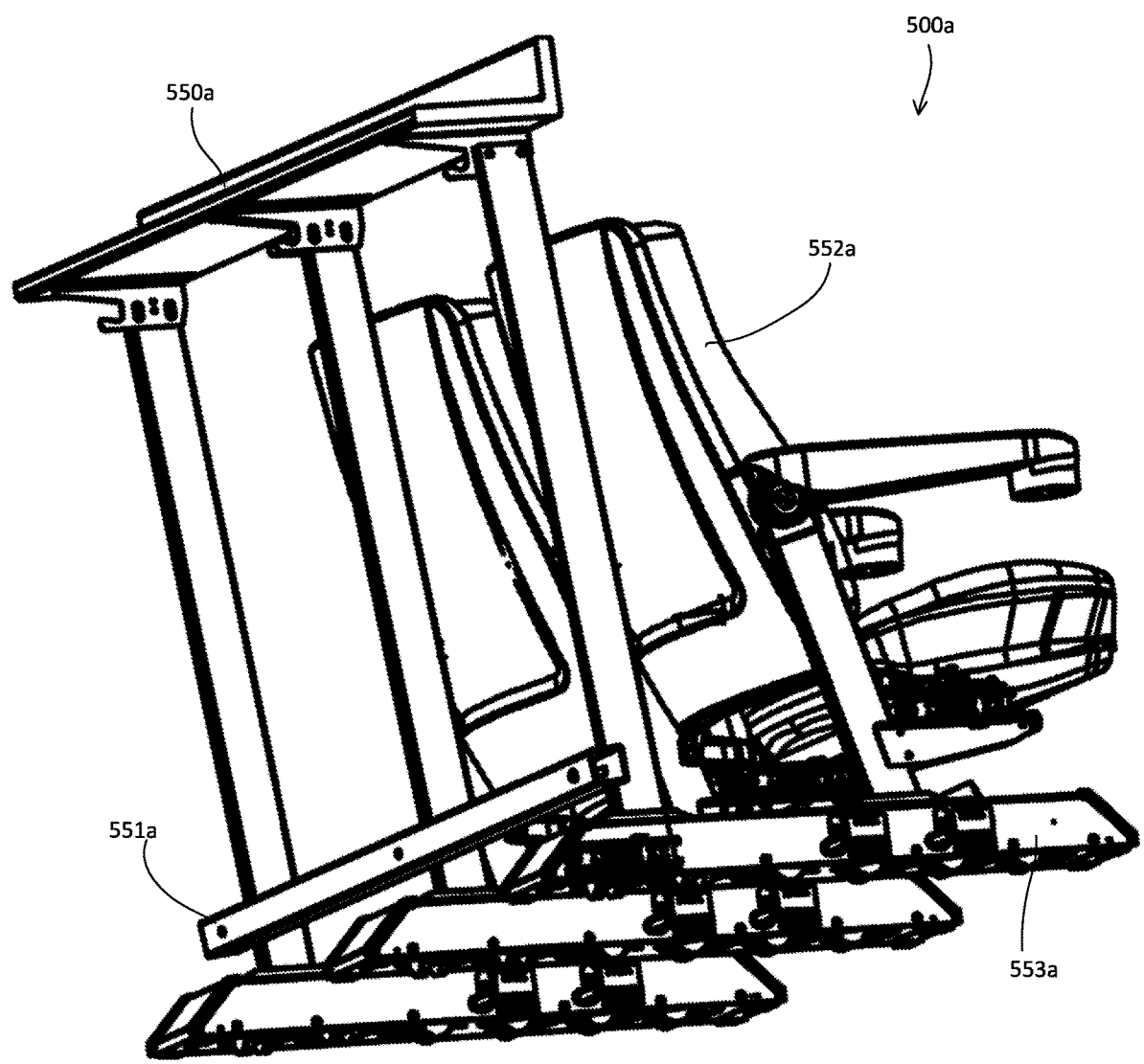
Figure 5B:
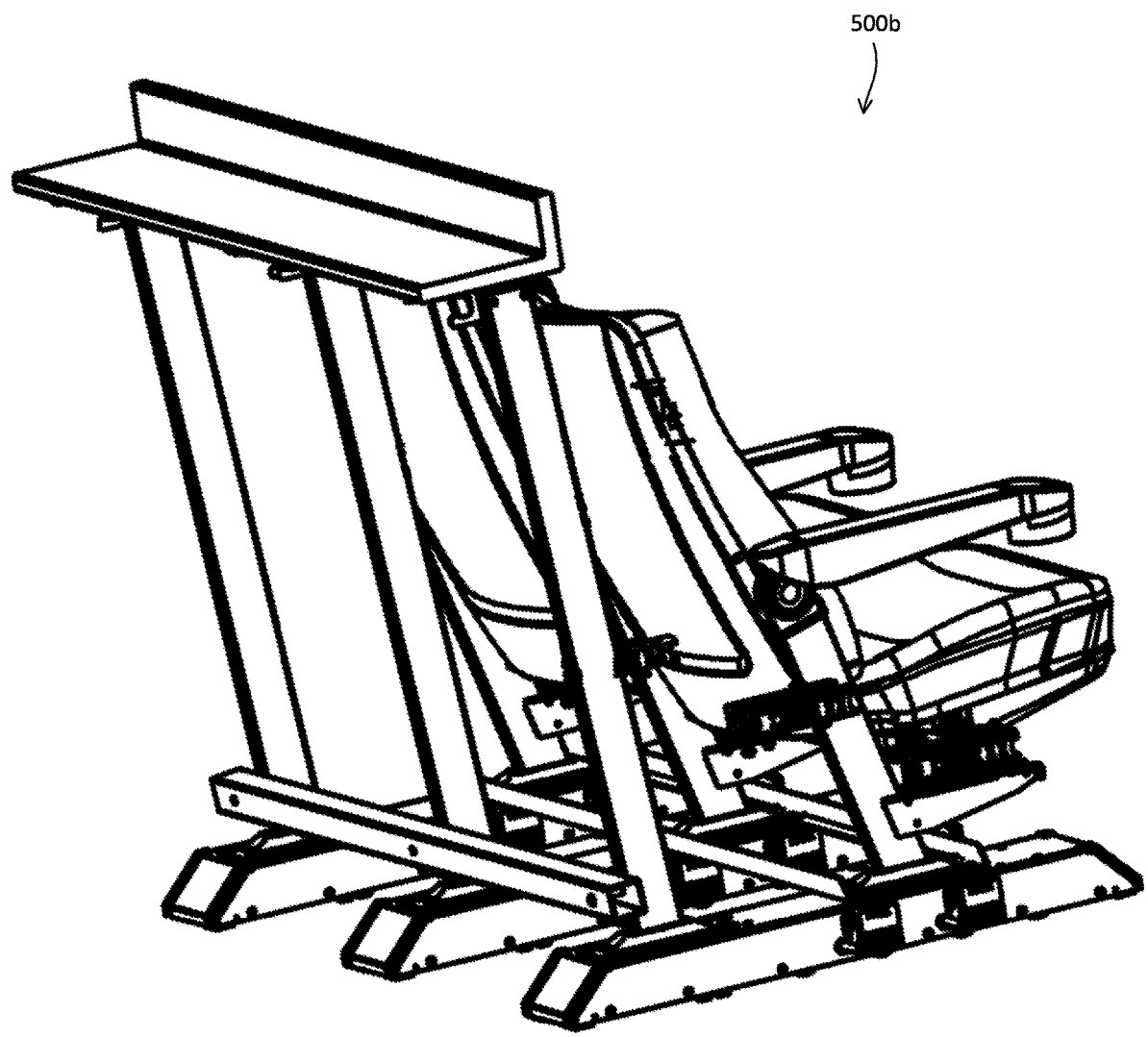
Figure 5C:
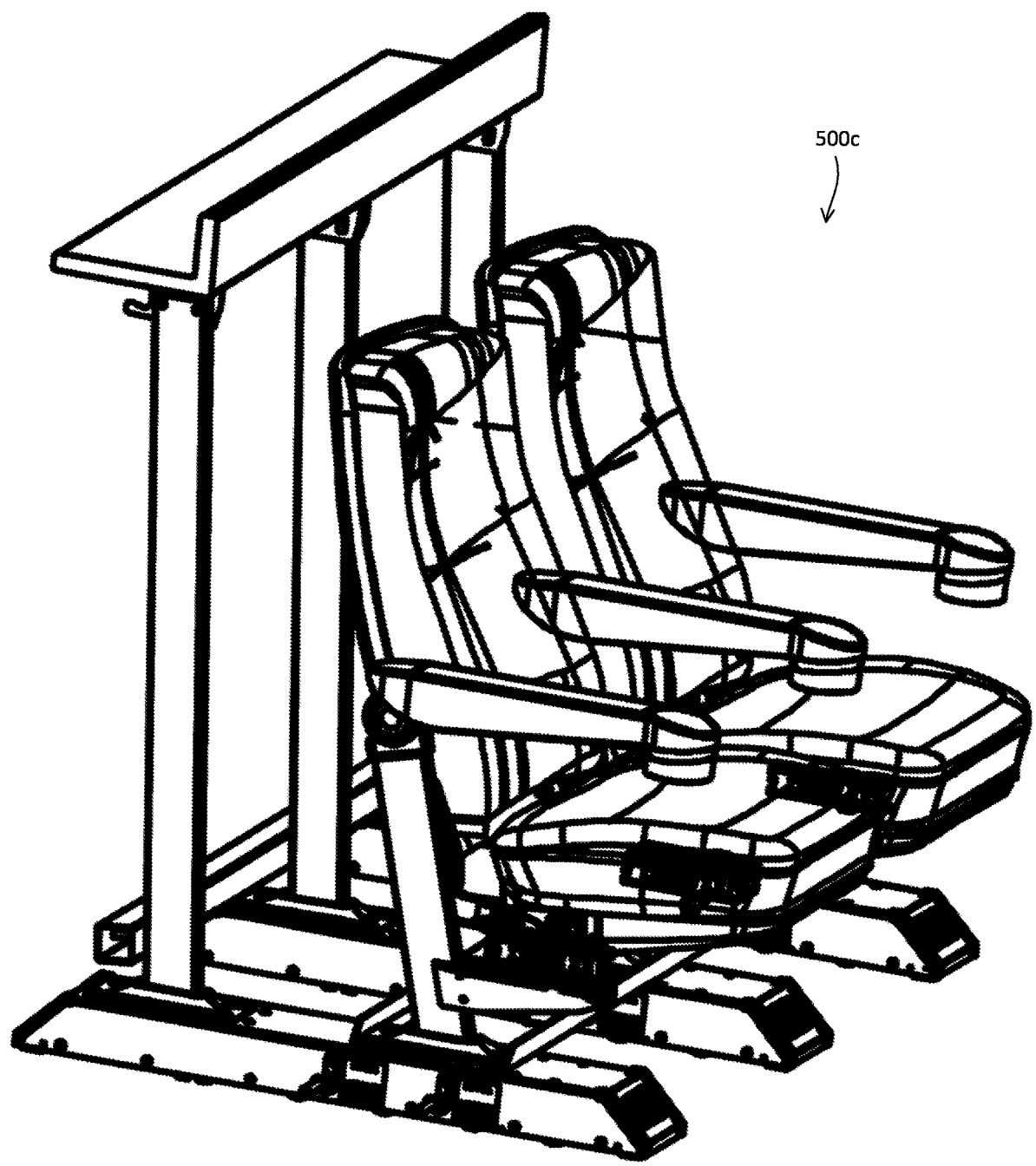
Figure 5D:
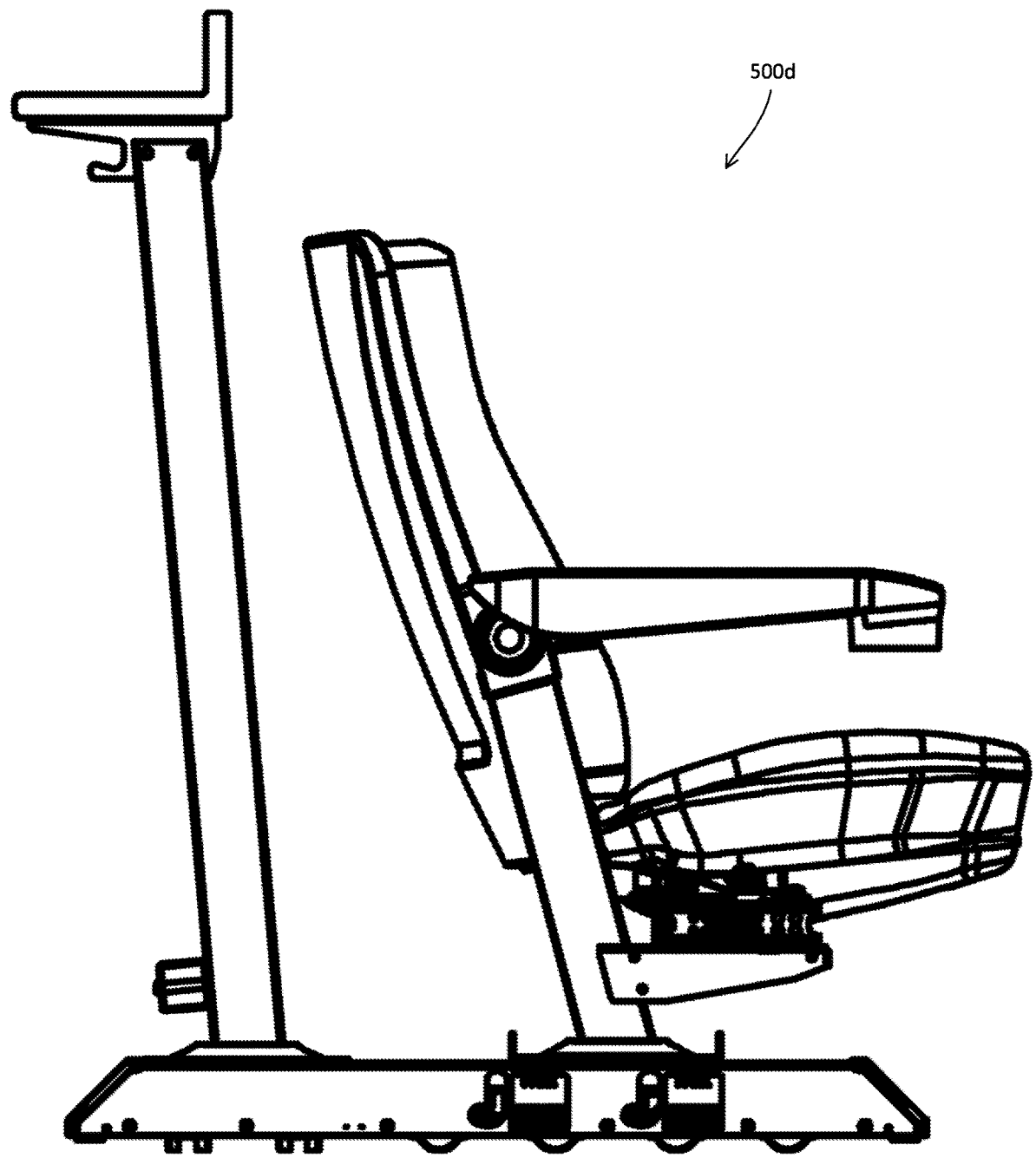

With reference to FIGS. 4A-I, chair assemblies 400a-i may include a cub holder 405a-i. The cub holders 405a-i may include a front clamp 407a having at least one alignment receptacle 408d (two alignment receptacles as shown in FIG. 4D) for receiving a respective alignment pin 406d of the cub holder 405a-i. As shown in FIGS. 4G-I, the front clamp 407b-e may clamp an edge of two adjacent chair backs 413g-i to secure the cup holder 405a-i to a back side of the chair assemblies 400a-i as best illustrated in FIGS. 4A and 4F.

As shown in FIG. 4D, the front clamp 407d may include a front information plate 810d having tabs 411d configured to be received within receptacles 409d of the front clamp 407d. For example, the front information plate 410d may be flexible and may be flexed to fit the tabs 411d into the receptacles 409d, and then released to secure the front information plate 410d to the front clamp 407d. The front information plate 410d may include a row and/or seat number and/or an advertisement, a logo, etc.

The cub holders 405a-i may further include a rear information plate 412d having tabs 411d configured to be received within receptacles of the cub holder 405d. For example, the rear information plate 412d may be flexible and may be flexed to fit the tabs into the receptacles, and then released to secure the rear information plate 412d to the cup holder 405d. The rear information plate 412d may include a row and/or seat number and/or an advertisement, a logo, etc. The front information plate 410d may cover attachment screws and may include advertisement venue naming rights, seat and/or row numbers, donor plates, etc.

Turning to FIGS. 5A-E, an example step-and-roll relocatable chair assembly 500a-d may include a drink rail 550a-d, a foot rail 551a-d, and at least one chair assembly 552a-d mounted on a step-and-roll mechanism 553a-d.

Figure 6:
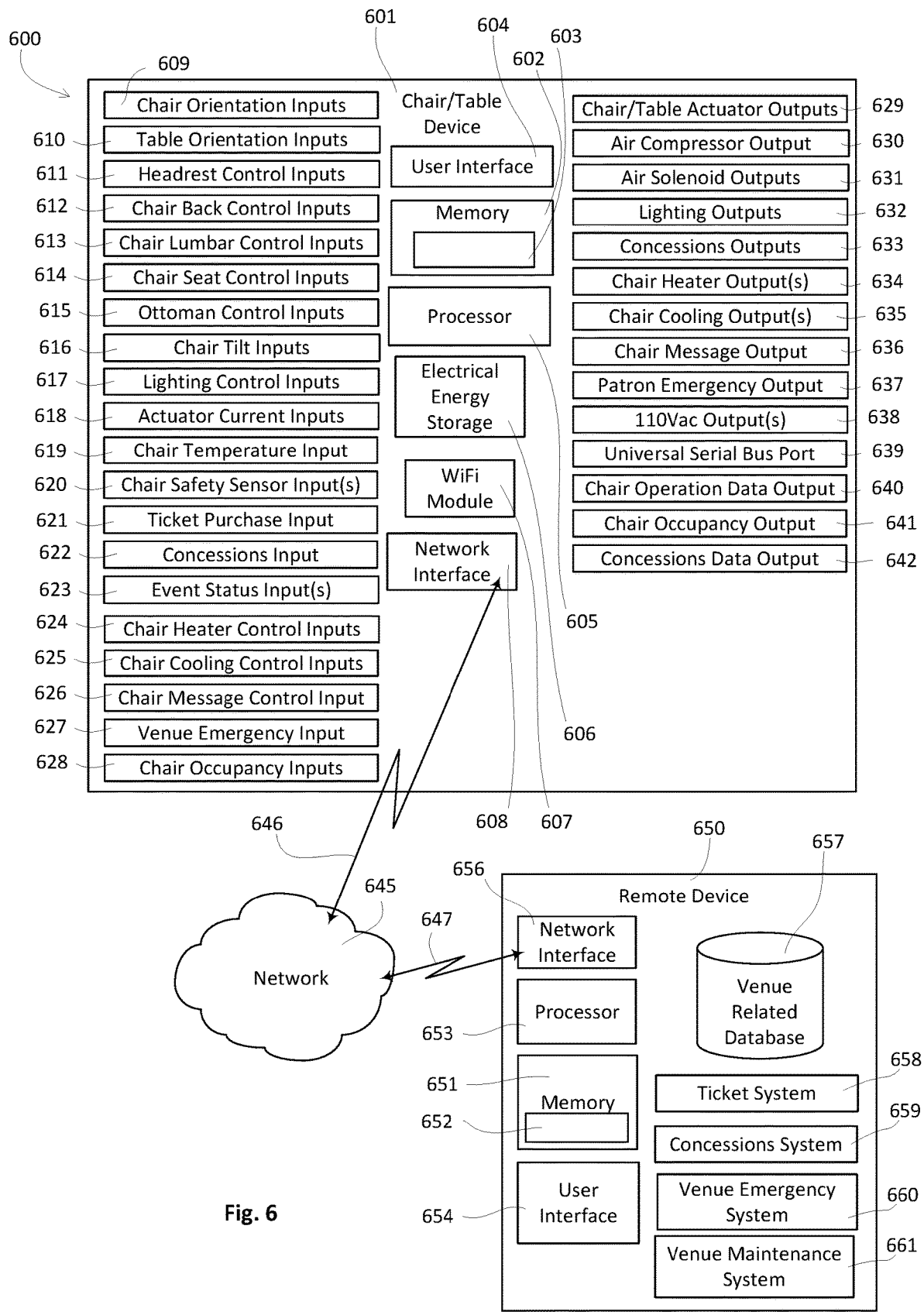
FIG. 6 depicts a block diagram of a control and management system for use with powered chairs and/or powered tables.

With reference to FIG. 6, a computer system 600 may include a chair/table device 601 communicatively coupled to a remote device 650 via, for example, a communication network 645. The computer system 600 may be similar to portions of the computer system 100a of FIG. 1A (e.g., a chair/table device 601 may be similar to, for example, computing device 161a and/or a remote device 650 may be similar to, for example, server 106a). In any event, the chair/table device 601 may include a computer-readable memory 602 having computer-readable instructions 603 stored thereon. A chair/table device 601 may be incorporated within any one of the chair assemblies and/or table assemblies as described herein and/or as described in the commonly assigned patents and patent applications incorporated herein by reference. The computer-readable instructions 603, when executed by a processor 605, may cause the processor to receive any one of, any combination of, or all of the inputs 609-628 and generate any one of, any combination of, or all of the outputs 329-642. Additionally, the processor 605 may further execute the computer-readable instructions 603 to communicate any one of, a combination of, or all of the inputs 609-628 and generate any one of, any combination of, or all of the outputs 629-642 to the remote device 650.

The chair/table device 601 may include a user interface 604, an electrical energy storage device 606 (e.g., a battery, a capacitor, etc.), a WiFi module 607, a network interface 608, chair orientation inputs 609 (e.g., a chair upright orientation pushbutton, a chair recline orientation pushbutton, etc.), table orientation inputs 610 (e.g., a table in-use orientation pushbutton, a table egress orientation pushbutton, etc.), chair headrest control inputs 611, chair back control inputs 612, chair lumbar control inputs 613, chair seat control inputs 614, ottoman control inputs 615, chair assembly tilt inputs 616, lighting control inputs 617, actuator current inputs 618, a chair temperature input 619, chair safety sensor inputs 620, a ticket purchase input 621, a concessions input 622, event status inputs 623 (e.g., QSC movie system inputs), chair heater control inputs 624, chair cooling control inputs 625, chair message control inputs 626, venue emergency inputs 627, and chair occupancy inputs 628.

The chair/table device 601 may also include chair/table actuator outputs 629, an air compressor output 630, air solenoid outputs 631 (e.g., a chair headrest inflator solenoid output, a chair lower lumbar inflator solenoid output, a chair seat inflator solenoid output, etc.), lighting outputs 632, concessions outputs 633, chair heater output(s) 634, chair cooling outputs(s) 635, a chair message output 636, a patron emergency output 637, 110 Vac outputs 638, a universal serial bus (USB) port 639, a chair operation data output 640, a chair occupancy output 641, and a concessions data output 642.

The processor 605 may execute the computer-readable instructions 603 to cause the processor 605 to transmit any one of, a combination of, or all of the inputs 609-628 and/or any one of, any combination of, or all of the outputs 629-642 to the processor 653 of the remote device 650 via the network interface 608, the network connection 646, the network 645, the network connection 647, and the network interface 656. Alternatively, or additionally, the processor 653 may execute the computer readable-instructions 652 stored on the memory 651 to receive any one of, a combination of, or all of the inputs 609-628 and/or any one of, any combination of, or all of the outputs 629-642 from the processor 605.

The remote device 650 may also include a user interface 654, a venue related data base 657, a ticketing system 658, a concessions system 659, a venue emergency system 660, and a venue maintenance system 661. The processor 653 may execute the computer-readable instructions 652 to cause the processor 653 to implement any one of the ticket system 658, the concessions system 659, the venue emergency system 660 and/or the venue maintenance system 661 based on, for example, any one of, a combination of, or all of the inputs 609-628 and/or any one of, any combination of, or all of the outputs 629-642 received from the processor 305.

A first chair assembly 207a and/or first table assembly 207b in a row of chair assemblies and/or table assemblies may include a chair/table device 601 having a network interface 608 configured to communication to a broker device (e.g., network 645) via message queuing telemetry transport (MQTT) publish-subscribe-based messaging protocol. The broker device 645 may include a computing device (e.g., a raspberry pi computing device) connected to a wireless router. The broker device 645 may execute an Eclipse Musquitto MQTT protocol versions 5.0, 3.1.1 and 3.1. In any event, the chair/table device 601 may be configured to publish data related to any one of the inputs 609-628 on a predetermined periodic basis and/or any time a status of an input changes state. Similarly, the chair/table device 601 may be configured to subscribe to communications transmitted by the broker 645.

Additionally, or alternatively, a first chair/table device 601 may include a hardwired output communications port 608 configured to, for example, transmit data to a second chair/table device 601. The second chair/table device 601 may include a hardwired input communications port 608 configured to, for example, receive data from the first chair/table device 601. The second chair/table device 601 may include a hardwired output communications port 608 configured to, for example, transmit data to a third chair/table device 601. The first chair/table device 601 (e.g., device 550a) may be located in a first chair assembly/table assembly (e.g., chair assembly/table assembly 515a of FIG. 5A), the second chair/table device 601 (e.g., device 550a) may be located in a second chair assembly/table assembly (e.g., chair assembly/table assembly 500a of FIG. 5A), and the third chair/table device 601 (e.g., device 509a) may be located in a third chair assembly/table assembly (e.g., chair assembly/table assembly 517a of FIG. 5A). The individual chair/table devices 601 may, thereby, communicate chair/table location (e.g., row/chair number information) between device 601, as described above, and to the remote device 650. The remote device 650 may utilize the data to, for example, provide a real time display with status data and/or icons proximate respective chair assemblies/table assemblies.

The chair/table device 601 may control lighting outputs 632 or a chair occupancy output 641 based on, for example, chair orientation inputs 609 (e.g., a chair upright orientation pushbutton, a chair recline orientation pushbutton, etc.). For example, when a chair is (or a group of chairs has been) determined to have been occupied during a previous event, a remote control may be configured to energize a lighting output 632 associated with each chair that is determined to be occupied (e.g., a venue cleaning). For example, when a chair is (or a group of chairs has been) determined to have been occupied during a previous event, a remote control may be configured to only open the chair(s) that were determined to be occupied (e.g., a venue cleaning). Thereby, venue cleaning may focus on those chairs that have been determined to have been occupied. Furthermore, a number of cycles of any given chair between an upright orientation and a reclined orientation may be reduced compared to opening/closing all chairs in between each event irrespective of whether the chair was occupied or not.

Although exemplary embodiments of the invention have been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An electric powered chair assembly control system, the system comprising:
   a remote control having a key-operated switch and/or a button and a transmitter antenna;
   a local chair controller having a receiver, wherein the local chair controller is coupled to an actuator for modifying a configuration of an individual theater seat, wherein the receiver comprises a radio unit for receiving a signal from the transmitter, a processor and control module structured to assimilate the received signal into actuator instructions to change the configuration of the theater seat between a first configuration wherein a leg support is fully raised and a second configuration in which the leg support is lowered.

2. The system of claim 1, further comprising:
an electrical energy storage device.

3. The system of claim 2, further comprising:
an electric energy storage device charger connected to the electric energy storage device and configured to charge the electric energy storage device.

4. The system of claim 2, wherein the electric energy storage device charger is connected to an output of an electric power supply.

5. The system of claim 1, wherein a user interface includes a first chair actuator status indicator.

6. The system of claim 1, wherein the user interface further includes a first chair heater status indicator.

7. The system of claim 1, wherein the controller further includes at least one of: a safety sensor input, an occupancy sensor input, an isle illumination output, or a row illumination output.

8. An electric powered chair assembly control system, the system comprising:
a remote control having a security feature selected from a group including: a key lock, password protection, or security handshake access;
a local chair controller configured to receive a chair reorientation signal from the remote control in response to the security feature indicating chair reorientation is secure, wherein the local chair controller is coupled to an actuator for modifying an orientation of a respective chair, and wherein the actuator is to change the orientation of the chair between an upright orientation to a reclined orientation in response to the remote control.

9. The system of claim 8, wherein a light output is energized in response to the security feature.

10. The system of claim 8, further comprising:
at least one of: a safety sensor input, an occupancy sensor input, an isle illumination output, or a row illumination output.

11. The system of claim 8, wherein a user interface includes a first chair actuator status indicator.

12. The system of claim 8, wherein the user interface further includes a first chair heater status indicator.

13. The system of claim 8, wherein the controller further includes at least one of: a safety sensor input, an occupancy sensor input, an isle illumination output, or a row illumination output.

14. An electric powered chair assembly control system, the system comprising:
a remote control having a security feature;
a local chair controller configured to receive a chair reorientation signal from the remote control in response to the security feature indicating that chair reorientation is secure, wherein the local chair controller is to change the orientation of the chair between an upright orientation to a reclined orientation in response to the remote control.

15. The system of claim 14, further comprising:
a user interface connected to the controller, wherein the user interface includes at least one chair actuator user control and at least one chair heater user control, wherein the controller is configured to control the first electric actuator, via the at least one chair actuator output, based on the at least one chair actuator user control, wherein the controller is configured to control the electric chair heater, via the at least one chair heater output, based on the at least one chair heater user control, and wherein the controller is configure to de-energize the first electric chair heater when the first electric actuator is energized.

16. The system of claim 15, wherein the user interface further includes a first chair actuator status indicator.

17. The system of claim 15, wherein the user interface further includes a first chair heater status indicator.

18. The system of claim 14, further comprising:
an electrical energy storage device.

19. The system of claim 18, further comprising:
an electric energy storage device charger connected to the electric energy storage device and configured to charge the electric energy storage device.

20. The system of claim 14, wherein the controller further includes at least one of: a safety sensor input, an occupancy sensor input, an isle illumination output, or a row illumination output.

* * * * *